United States Patent
Chen et al.

(10) Patent No.: US 12,549,772 B2
(45) Date of Patent: Feb. 10, 2026

(54) OBJECT MASK INFORMATION FOR SUPPLEMENTAL ENHANCEMENT INFORMATION MESSAGE

(71) Applicant: Alibaba Innovation Private Limited, Singapore (SG)

(72) Inventors: Jie Chen, Beijing (CN); Yan Ye, San Diego, CA (US); Shurun Wang, Beijing (CN)

(73) Assignee: Alibaba Innovation Private Limited, Singapore (SG)

( * ) Notice: Subject to any disclaimer, the term of this patent is extended or adjusted under 35 U.S.C. 154(b) by 25 days.

(21) Appl. No.: 18/624,636

(22) Filed: Apr. 2, 2024

(65) Prior Publication Data

US 2024/0357179 A1 Oct. 24, 2024

Related U.S. Application Data

(60) Provisional application No. 63/615,294, filed on Dec. 28, 2023, provisional application No. 63/587,750, (Continued)

(51) Int. Cl.
H04N 19/70 (2014.01)
G06T 7/50 (2017.01)
(Continued)

(52) U.S. Cl.
CPC .............. H04N 19/70 (2014.11); G06T 7/50 (2017.01); G06V 10/25 (2022.01); G06V 10/44 (2022.01); H04N 19/172 (2014.11); H04N 19/46 (2014.11)

(58) Field of Classification Search
CPC ...... H04N 19/70; H04N 19/172; H04N 19/46; G06T 7/50; G06V 10/25; G06V 10/44
(Continued)

(56) References Cited

U.S. PATENT DOCUMENTS

2016/0227248 A1 8/2016 Choi et al.
2018/0278964 A1* 9/2018 Wang ................. H04N 21/6332
(Continued)

FOREIGN PATENT DOCUMENTS

CN 115225901 A 10/2022
CN 116349227 A * 6/2023 ............. H04N 19/88
(Continued)

OTHER PUBLICATIONS

"Requirements for a Future Video Coding Standard v5," International Organisation for Standardisation, Torino, IT, 14 pages (2017).
(Continued)

Primary Examiner — Marnie A Matt
(74) Attorney, Agent, or Firm — Finnegan, Henderson, Farabow, Garrett & Dunner, LLP

(57) ABSTRACT

Methods and apparatuses are provided for processing video data by using an object mask information (OMI) supplemental enhancement information (SEI) message. An exemplary encoding method includes: receiving a video sequence; and encoding one or more pictures of the video sequence to generate a bitstream, comprising: encoding an auxiliary picture indicating a mask of an object in a primary picture, the mask of the object being represented by a sample value of the auxiliary picture; and generating a supplemental enhancement information (SEI) message indicating an attribute of the mask of the object.

20 Claims, 13 Drawing Sheets

Related U.S. Application Data filed on Oct. 4, 2023, provisional application No. 63/495,546, filed on Apr. 11, 2023.

(51) Int. Cl.
  *G06V 10/25* (2022.01)
  *G06V 10/44* (2022.01)
  *H04N 19/172* (2014.01)
  *H04N 19/46* (2014.01)

(58) Field of Classification Search
  USPC ........................................... 375/240.1
  See application file for complete search history.

(56) References Cited

U.S. PATENT DOCUMENTS

| | | | |
|---|---|---|---|
| 2021/0385497 A1* | 12/2021 | He | H04N 19/184 |
| 2022/0180569 A1 | 6/2022 | Lee et al. | |
| 2023/0097425 A1* | 3/2023 | Choi | H04N 19/88 375/240.26 |
| 2024/0348816 A1* | 10/2024 | Chen | H04N 19/172 |

FOREIGN PATENT DOCUMENTS

| | | | | |
|---|---|---|---|---|
| WO | WO-2021252512 A1 * | 12/2021 | | H04N 19/184 |
| WO | 2022069388 A1 | 4/2022 | | |
| WO | 2022260900 A1 | 12/2022 | | |

OTHER PUBLICATIONS

Chen et al., "Algorithm Description of Joint Exploration Test Model 7 (JEM 7)," JVET-G1001-v1, 7th Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
International Telecommunications Union "Series H: Audiovisual and Multimedia Systems Infrastructure of audiovisual services—Coding of moving video", ITU-T Telecommunication Standardization Sector of ITU, May 2022, 110 pages.
International Telecommunications Union "Series H: Audiovisual and Multimedia Systems Infrastructure of audiovisual services—Coding of moving video", ITU-T Telecommunication Standardization Sector of ITU, Aug. 2021, 716 pages.
Jem, https://jvet.hhl.fraunhofer.de/svn/svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion mailed Jun. 20, 2024, issued in corresponding International Application No. PCT/CN2024/087335 (6 pgs.).

* cited by examiner

604

802 — Determine whether the mask of the object is different from a previous mask of the object represented by a previous auxiliary picture, in response to the determination that the cancel flag indicates that the SEI message cancels the persistence of information of the previous SEI message 804 — Encode the attribute of the mask of the object in the SEI message, in response to the determination that the mask of the object is different from the previous mask of the object

FIG. 8

$$\frac{1}{\text{bitdepth-1}} \quad - \quad - \quad - \quad \frac{1}{\text{2-nd}} \quad \frac{0}{\text{1-st}} \quad \frac{0}{\text{0-th}}$$

FIG. 9

| Primary Picture 1101 | Auxiliary Picture 1102 | Object Mask Information (OMI) Supplemental Enhancement Information (SEI) 1103 |

OBJECT MASK INFORMATION FOR SUPPLEMENTAL ENHANCEMENT INFORMATION MESSAGE

CROSS-REFERENCE TO RELATED APPLICATIONS

The disclosure claims the benefits of priority to U.S. Provisional Application No. 63/495,546, filed on Apr. 11, 2023, U.S. Provisional Application No. 63/587,750, filed on Oct. 4, 2023, and U.S. Provisional Application No. 63/615,294, filed on Dec. 28, 2023, all of which are incorporated herein by reference in their entireties.

TECHNICAL FIELD

The present disclosure generally relates to video processing, and more particularly, to methods and apparatuses for signaling an object mask information (OMI) supplemental enhancement information (SEI) message.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for signaling an object mask information (OMI) supplemental enhancement information (SEI) message.

According to some exemplary embodiments, there is provided a method for detecting an object including: receiving a bitstream; decoding coded information of the bitstream to obtain a primary picture and an auxiliary picture, wherein the auxiliary picture indicates a mask of an object in the primary picture, and the mask of the object is represented by a sample value of the auxiliary picture; and decoding the coded information of the bitstream to obtain a supplemental enhancement information (SEI) message, the SEI message indicating an attribute of the mask of the object.

According to some exemplary embodiments, there is provided an encoding method including: receiving a video sequence; and encoding one or more pictures of the video sequence to generate a bitstream, comprising: encoding an auxiliary picture indicating a mask of an object in a primary picture, the mask of the object being represented by a sample value of the auxiliary picture; and generating a supplemental enhancement information (SEI) message indicating an attribute of the mask of the object.

According to some exemplary embodiments, there is provided a non-transitory computer readable storage medium storing a bitstream of a video. The bitstream includes: a primary picture having an object; an auxiliary picture indicating a mask of the object, the mask of the object being represented by a sample value of the auxiliary picture; and a supplemental enhancement information (SEI) message indicating an attribute of the mask of the object.

BRIEF DESCRIPTION OF THE DRAWINGS

Embodiments and various aspects of the present disclosure are illustrated in the following detailed description and the accompanying figures. Various features shown in the figures are not drawn to scale.

FIG. 8 is a schematic diagram illustrating the sub-steps of an exemplary method for encoding a video sequence into a bitstream, consistent with embodiments of the disclosure.

FIG. 9 shows an exemplary binary presentation of sample value p[x][y], according to some embodiments of the present disclosure.

FIG. 11 is a schematic diagram illustrating contents of an exemplary bitstream.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve this goal, since 2015, the JVET has been developing technologies beyond HEVC using the joint exploration model (JEM) reference software. As coding technologies being incorporated into the JEM, the JEM achieved substantially higher coding performance than HEVC. In October 2017, a joint call for proposals (CfP) was issued by VCEG and MPEG to formally start the development of next generation video compression standard beyond HEVC. Responses to the CfP were evaluated at the JVET meeting in San Diego in April 2018, and the formal development process of the VVC standard started in April 2018.

The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

Figure 1:
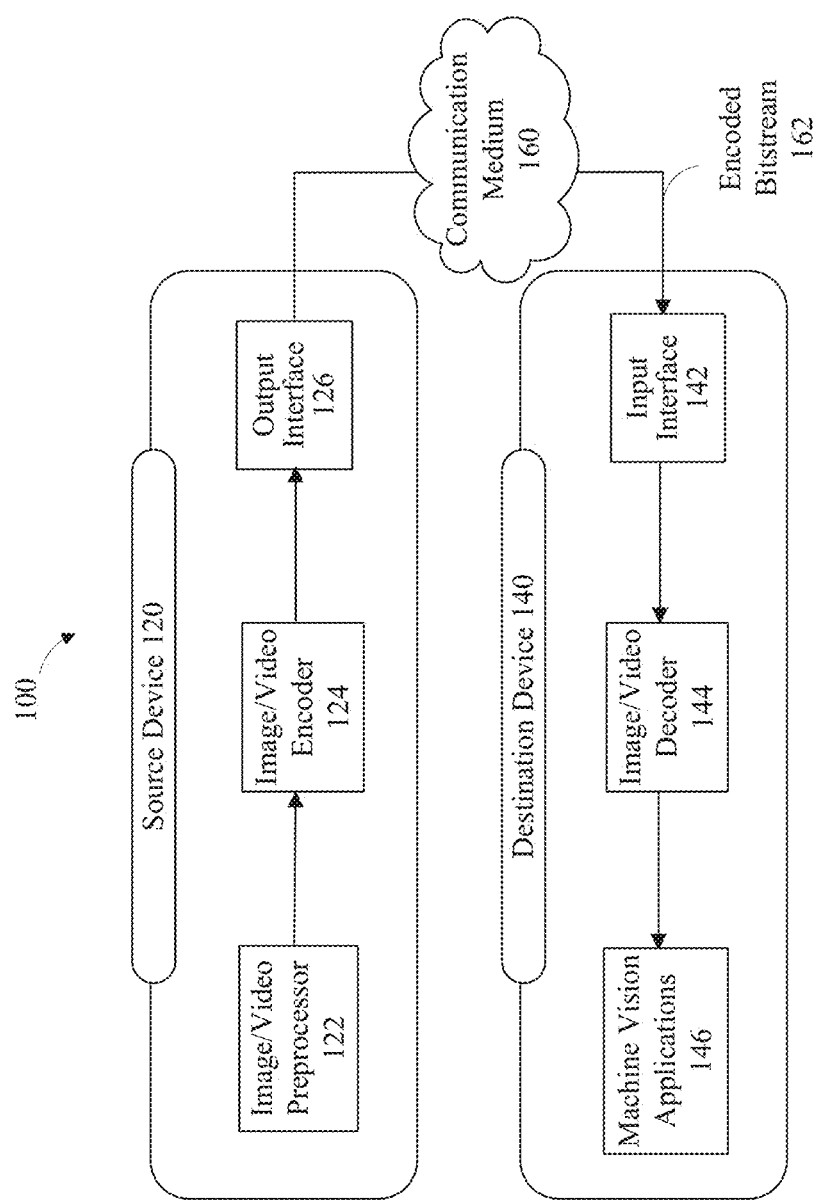
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques (such as those implemented by encoder 124 and decoder 144 of FIG. 1) are described in connection with FIGS. 2A-2B and FIGS. 3A-3B.

Figure 2A:
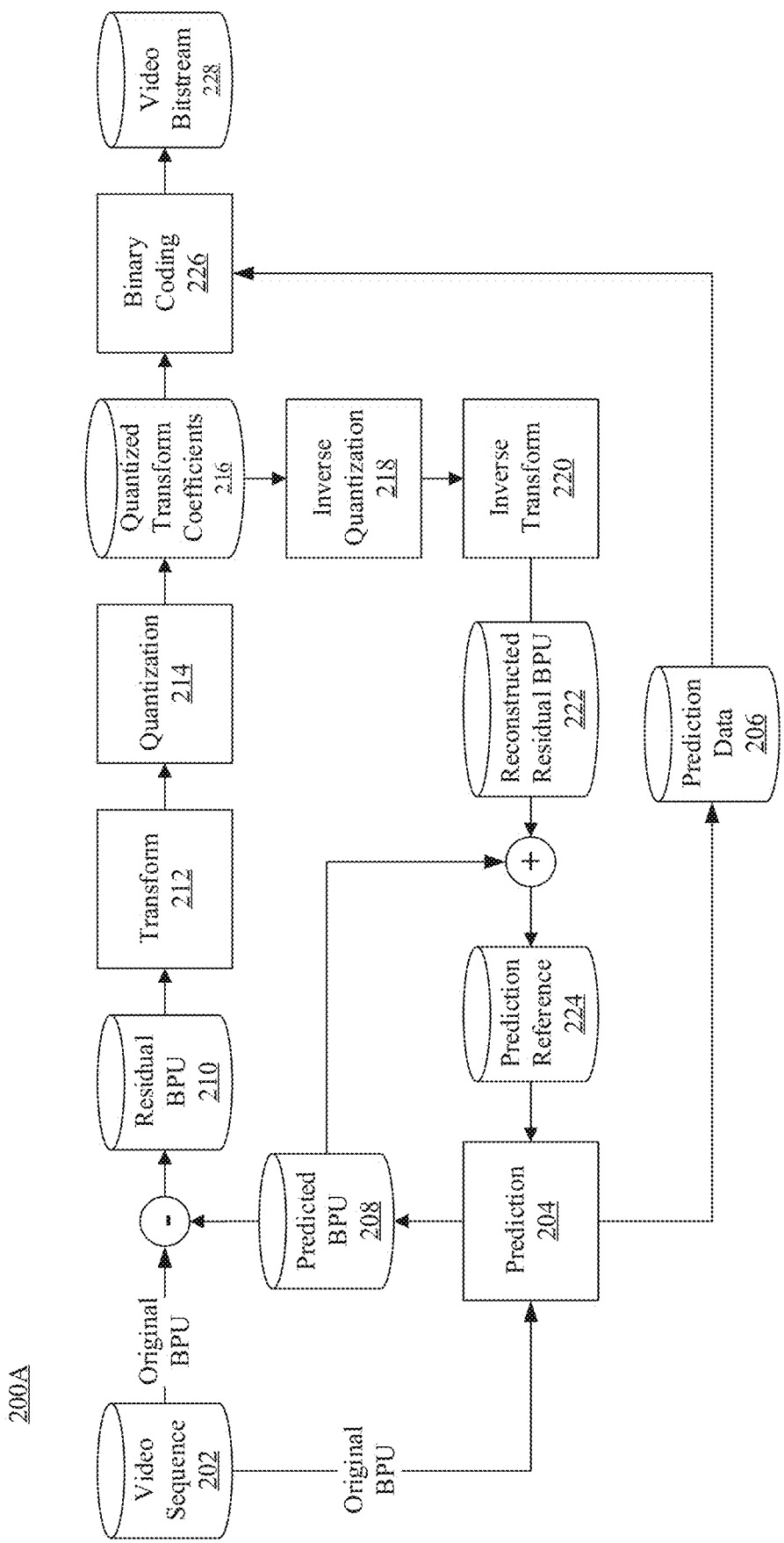
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
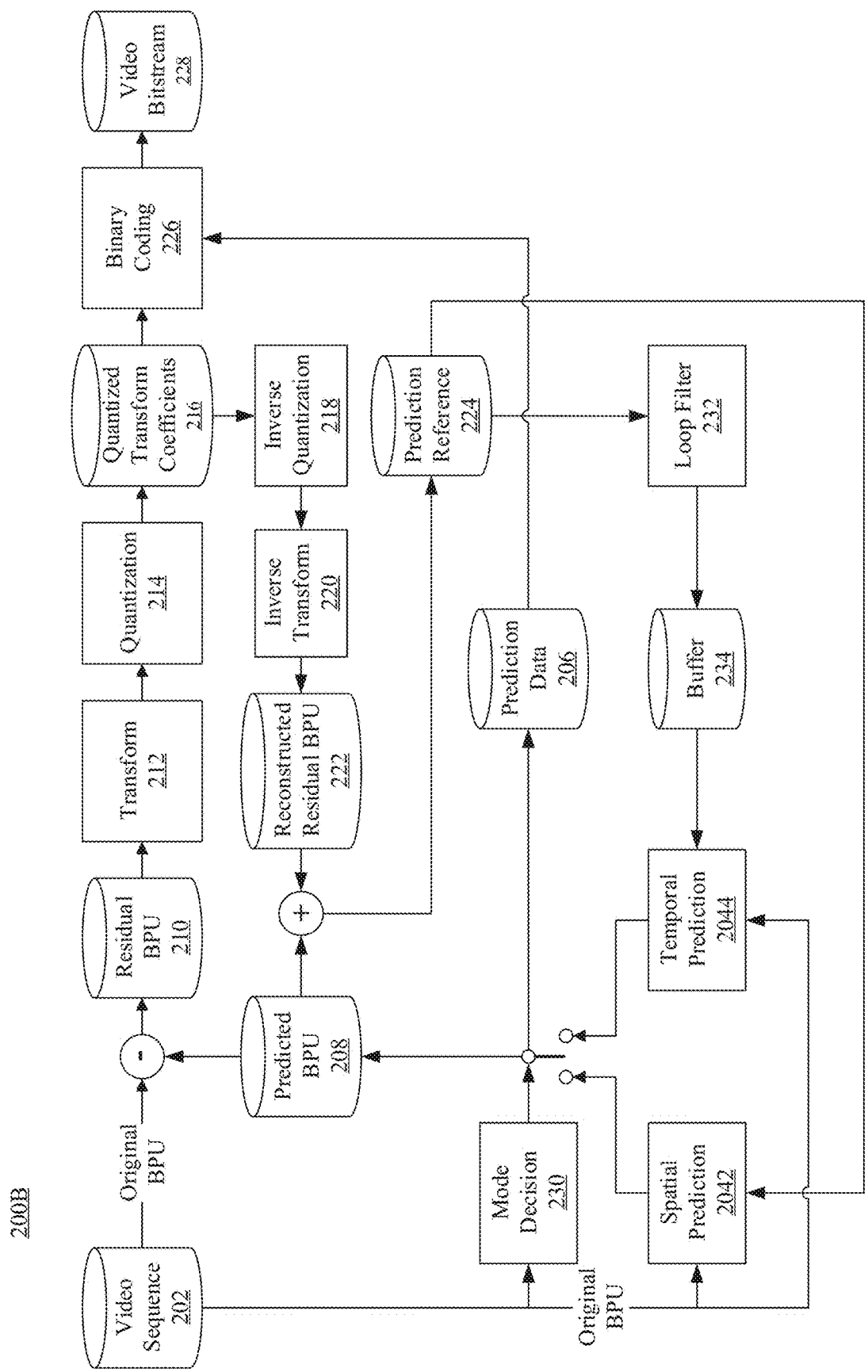
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

In some embodiments, the input video sequence 202 is processed block by block according to encoding process 200B. In VVC, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or ternary tree. At the leaf nodes of the partitioning structure, coding information such as coding mode (intra mode or inter mode), motion information (reference index, motion vector difference, etc.) if inter coded, and quantized transform coefficients 216 are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision stage 230 choose the best prediction mode for the current block, for example based on the rate-distortion optimization method. Based on the best prediction mode, predicted BPU 208 is generated and subtracted from the input video block.

Still referring to FIG. 2B, the prediction residual BPU 210 is sent to the transform stage 212 and quantization stage 214 to generate quantized transform coefficients 216. Quantized transform coefficients 216 will then be inverse quantized at inverse quantization stage 218 and inverse transformed at inverse transform stage 220 to obtain the reconstructed residual BPU 222. Predicted BPU 208 and reconstructed residual BPU 222 are added together to form prediction reference 224 before loop filtering, which is used to provide reference samples for intra prediction. Loop filtering such as deblocking, sample adaptive offset (SAO), and adaptive loop filter (ALF) may be applied at loop filter stage 232 to prediction reference 224 to form the reconstructed block, which is stored in buffer 234, and used to provide reference samples for inter prediction. Coding information, which is generated at mode decision stage 230, such as coding mode (intra or inter prediction), intra prediction mode, motion information, quantized residual coefficients, and the like, are sent to binary coding stage 226 to further reduce the bit rate before being packed into the output video bitstream 228.

Figure 3A:
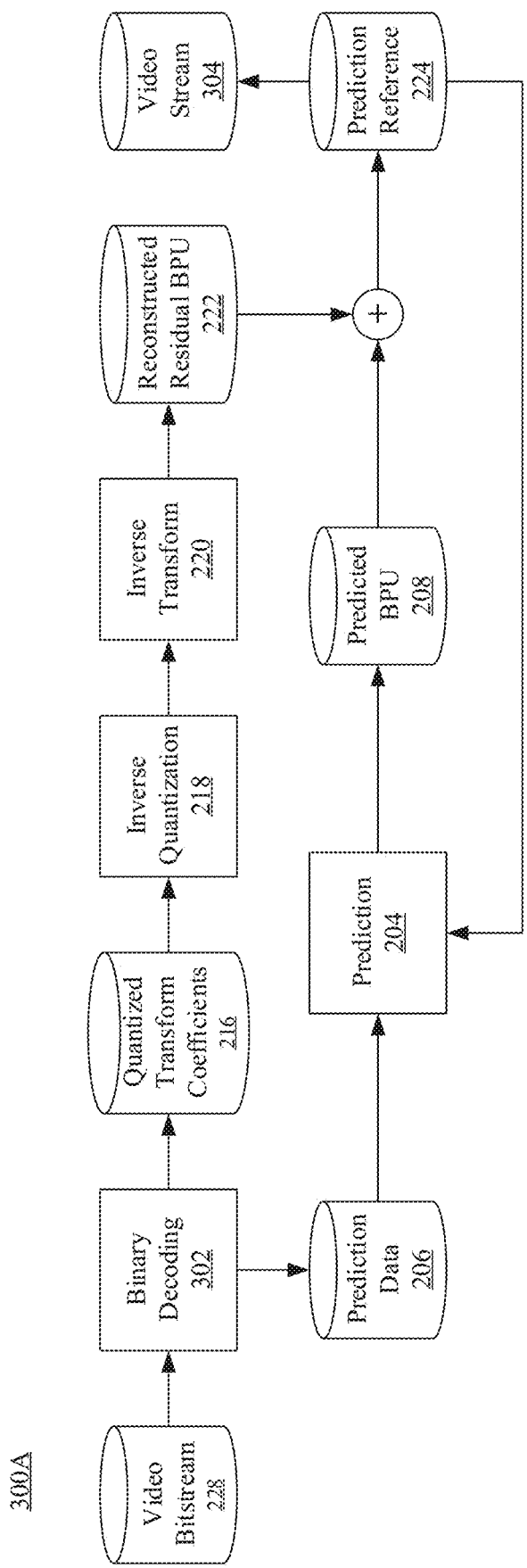
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
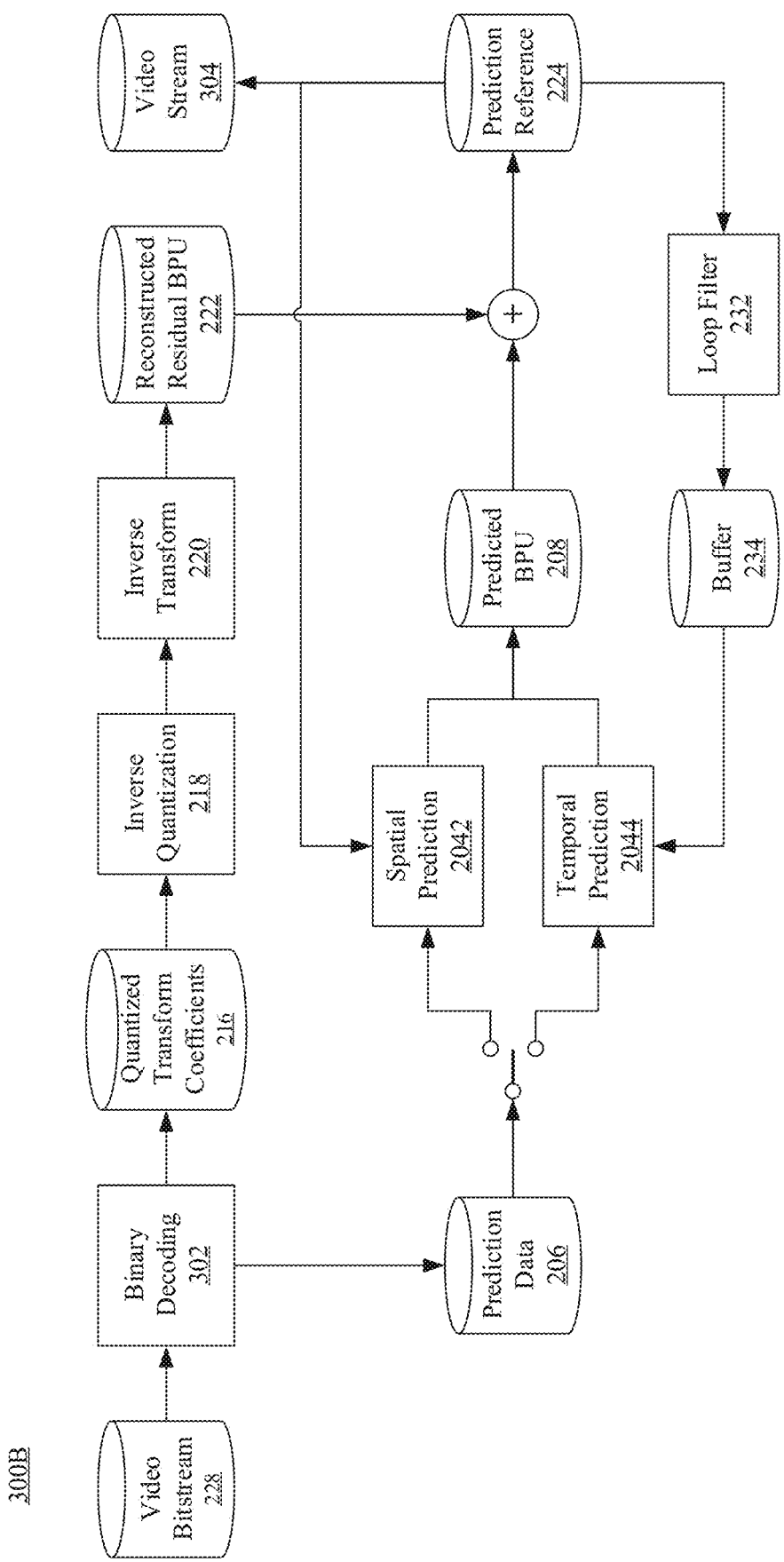
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
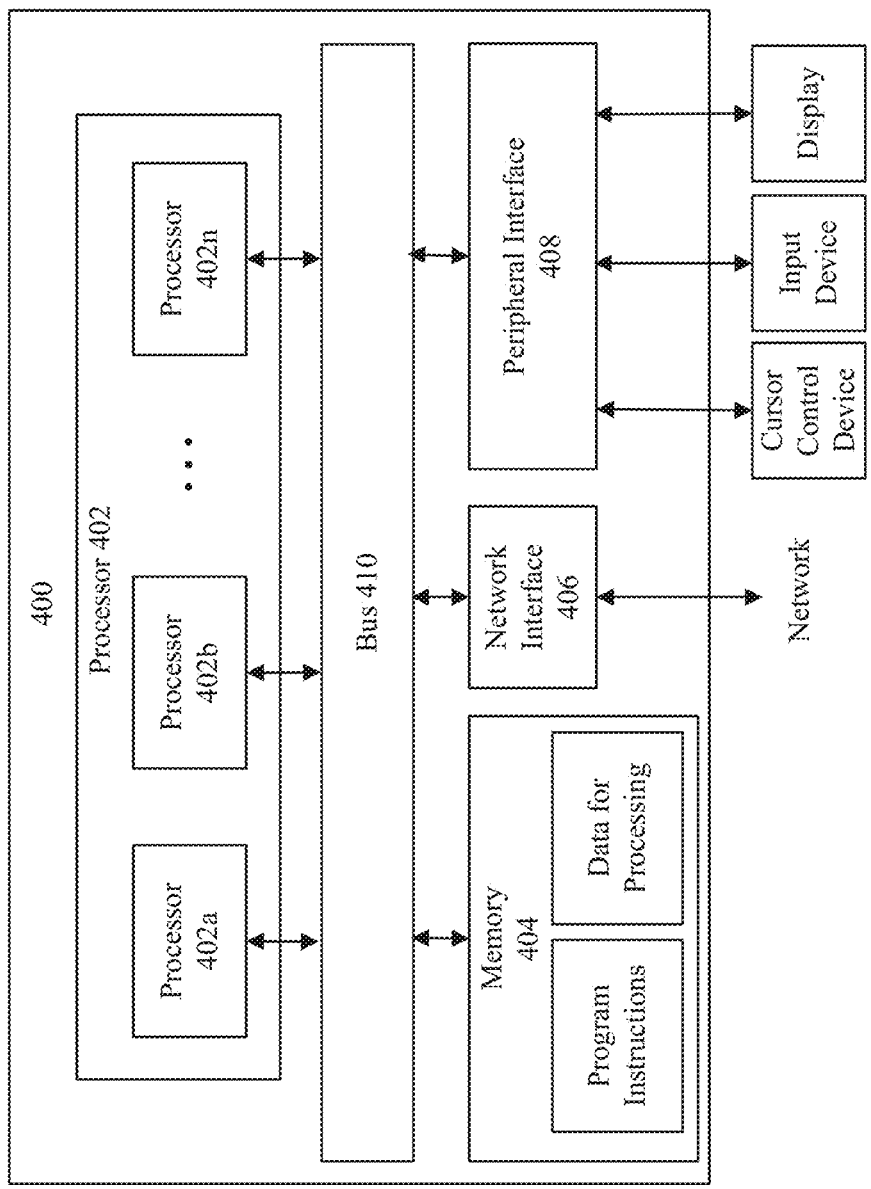
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

A video bitstream used in VVC or HEVC is a sequence of bits in form of network abstraction layer (NAL) unit or byte stream forms one or more coded video sequences (CVS), and each CVS consists of one or more coded layer video sequences (CLVS). Among these layers, inter-layer prediction may be applied to achieve high compression performance. Here, a layer is a set of video coding layer (VCL) NAL units that all have a particular value of NAL layer ID and the associated non-VCL NAL unit. And a VCL NAL unit is a collective term for coded slice NAL units and the subset of NAL units that have reserved values of NAL unit type that are classified as VCL NAL units. Inter layer prediction may be applied between different layers.

Supplemental enhancement information (SEI) messages are intended to be conveyed within coded video bitstream in a manner specified in a video coding specification or to be conveyed by other means determined by the specifications for systems that make use of such coded video bitstream. SEI messages can contain various types of data that indicate the timing of the video pictures or describe various properties of the coded video or how it can be used or enhanced. SEI messages are also defined that can contain arbitrary user-defined data. SEI messages do not affect the core decoding process, but can indicate how the video is recommended to be post-processed or displayed.

To specify SEI message, the JVET work group also developed H.274 standard which specifies the syntax and semantics of video usability information (VUI) parameters and supplemental enhancement information (SEI) messages that is particularly intended for use with coded video bitstreams as specified by VVC standard. But since neither VUI parameters nor SEI message affects the decoding process, the SEI messages in H.274 can also be used with other types of coded video bitstream, such as H.265/HEVC, H.264/AVC, etc.

For the purpose of object detection and tracking, the latest version of HEVC standard and VSEI standard adopted an annotated region (AR) SEI message which carries parameters to describe the bounding box of detected or tracked objects within the compressed video bitstream, so that the decoder-sider device needn't perform video analysis to recognize the object if an encoder, a transcoder, or a network node has already done it. This is beneficial to applications where the decoder device has limited computation resource or limited power supplies. Meanwhile, performing object detecting and tracking at encoder side and transmitting the information to the decoder can help improve the quality of the detection and tracking since encoder can perform the detection and tracking task using the original video which could be with much higher quality than the reconstructed video recovered in the decoder side.

In the AR SEI message in HEVC, besides the bounding box of the detected or tracked object, object labels and confidence levels associated with the objects may also be provided. The object label gives the information on what kind of object it is, and the confidence level shows the fidelity of the detected or tracked object in the bounding box. Additionally, a flag indicating if bounding boxes in the current SEI message represent the position of objects which may be occluded or partially occluded by other objects or only represent the position of the visible part of the object is provided. And a flag indicating if the object represented by the current bounding box is only partially visible can be optionally signaled for each bounding box as well.

The syntax of AR SEI message uses persistence of parameters to avoid the need to re-signal information already available in previous SEI message within the same persistence scope. For example, if a first detected object stays stationary in the current picture relative to previous coded pictures and a second detected object moves from one picture to another, then only bounding box information for the second object needs to be signaled, and the location/bounding box information of the first object can be copied from previous SEI messages.

The main video coding standards, such as H.264/AVC, H.265/HEVC and H.266/VVC, all support to encode a special kind of pictures, so called auxiliary picture, to provide auxiliary information to the normal picture which is so called primary picture. An auxiliary picture that has no normative effect on the decoding process of primary pictures. The bitstream of auxiliary picture and the primary picture are packed into one coded video sequence (CVS). And the necessary information interpreting the auxiliary picture is transmitted by SEI message.

In HEVC, auxiliary pictures are coded as one or more auxiliary picture layers different from primary picture layer. The indication of auxiliary is signaled in video parameter set (VPS) extension as shown in Table 1 below.

TABLE 1

VPS extension syntax

|  | Descriptor |
|---|---|
| vps_extension( ) { | |
|   if( vps_max_layers_minus1 > 0 && vps_base_layer_internal_flag ) | |
|     profile_tier_level( 0, vps_max_sub_layers_minus1 ) | |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= MaxLayersMinus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
| } | | splitting_flag equal to 1 indicates that the dimension_id [i][j] syntax elements are not present and that the binary representation of the nuh_layer_id value in the NAL unit header are split into NumScalabilityTypes segments with lengths, in bits, according to the values of dimension_id_len_minus1[j] and that the values of dimension_id[LayerIdxInVps[nuh_layer_id]][j] are inferred from the NumScalabilityTypes segments. splitting_flag equal to 0 indicates that the syntax elements dimension_id[i][j] are present.

When splitting_flag is equal to 1, scalability identifiers of the present scalability dimensions can be derived from the nuh_layer_id syntax element in the NAL unit header by a bit masked copy. The respective bit mask for the i$^{th}$ present scalability dimension is defined by the value of the dimension_id_len_minus1[i] syntax element and dimBitOffset[i] as specified in the semantics of dimension_id_len_minus1[j].

scalability_mask_flag[i] equal to 1 indicates that dimension_id syntax elements corresponding to the i$^{th}$ scalability dimension in Table 2 below are present. scalability_mask_flag[i] equal to 0 indicates that dimension_id syntax elements corresponding to the i$^{th}$ scalability dimension are not present.

TABLE 2

Mapping of ScalabiltyId to scalability dimensions

| Scalability mask index | Scalability dimension | ScalabilityId mapping |
|---|---|---|
| 0 | Texture or depth | DepthLayerFlag |
| 1 | Multiview | ViewOrderIdx |
| 2 | Spatial/quality scalability | DependencyId |
| 3 | Auxiliary | AuxId |
| 4-15 | Reserved | | dimension_id_len_minus1[j] plus 1 specifies the length, in bits, of the dimension_id[i][j] syntax element.

When splitting_flag is equal to 1, the following applies:
The variable dimBitOffset[0] is set equal to 0 and for j in the range of 1 to NumScalabilityTypes−1, inclusive, dimBitOffset[j] is derived as follows:

$$dimBitOffset[j] = \sum_{dimIdx=0}^{j-1} (dimension\_id\_len\_minus1[dimIdx] + 1) \quad (F-1)$$

The value of dimension_id_len_minus1[NumScalabilityTypes−1] is inferred to be equal to 5−dimBitOffset[NumScalabilityTypes−1].

The value of dimBitOffset[NumScalabilityTypes] is set equal to 6.

It is a requirement of bitstream conformance that when NumScalabilityTypes is greater than 0, dimBitOffset[NumScalabilityTypes−1] is less than 6.

vps_nuh_layer_id_present_flag equal to 1 specifies that layer_id_in_nuh[i] for i from 1 to MaxLayersMinus1, inclusive, are present. vps_nuh_layer_id_present_flag equal to 0 specifies that layer_id_in_nuh[i] for i from 1 to MaxLayersMinus1, inclusive, are not present.

layer_id_in_nuh[i] specifies the value of the nuh_layer_id syntax element in VCL NAL units of the i$^{th}$ layer. When i is greater than 0, layer_id_in_nuh[i] is greater than layer_id_in_nuh[i−1]. For any value of i in the range of 0 to MaxLayersMinus1, inclusive, when not present, the value of layer_id_in_nuh[i] is inferred to be equal to i.

For i from 0 to MaxLayersMinus1, inclusive, the variable LayerIdxInVps[layer_id_in_nuh[i]] is set equal to i.

dimension_id[i][j] specifies the identifier of the j$^{th}$ present scalability dimension type of the i$^{th}$ layer. The number of bits used for the representation of dimension_id[i][j] is dimension_id_len_minus1[j]+1 bits.

Depending on splitting_flag, the following applies:
If splitting_flag is equal to 1, for i from 0 to MaxLayersMinus1, inclusive, and j from 0 to NumScalabilityTypes−1, inclusive, dimension_id[i][j] is inferred to be equal to ((layer_id_in_nuh[i] & ((1<<dimBitOffset[j+1])−1))>>dimBitOffset[j]).

Otherwise (splitting_flag is equal to 0), for j from 0 to NumScalabilityTypes−1, inclusive, dimension_id[0][j] is inferred to be equal to 0.

The variable ScalabilityId[i][smIdx] specifying the identifier of the (smIdx)$^{th}$ scalability dimension type of the i$^{th}$ layer, and the variables DepthLayerFlag[lId], ViewOrderIdx[lId], DependencyId[lId], and AuxId[lId] specifying the depth flag, the view order index, the spatial/quality scalability identifier and the auxiliary identifier, respectively, of the layer with nuh_layer_id equal to lId are derived as follows:

```
NumViews = 1
for( i = 0; i <= MaxLayersMinus1; i++ ) {
  lId = layer_id_in_nuh[ i ]
  for( smIdx= 0, j = 0; smIdx < 16; smIdx++ ) {
    if( scalability_mask_flag[ smIdx ] )
      ScalabilityId[ i ][ smIdx ] = dimension_id[ i ][ j++ ]
    else
      ScalabilityId[ i ][ smIdx ] = 0
  }
  DepthLayerFlag[ lId ] = ScalabilityId[ i ][ 0 ]
  ViewOrderIdx[ lId ] = ScalabilityId[ i ][ 1 ]
  DependencyId[ lId ] = ScalabilityId[ i ][ 2 ]
  AuxId[ lId ] = ScalabilityId[ i ][ 3 ]
  if( i > 0 ) {
    newViewFlag = 1
    for( j = 0; j < i; j++ )
      if( ViewOrderIdx[ lId ] = = ViewOrderIdx[ layer_id_in_nuh[ j ] ] )
        newViewFlag = 0
    NumViews += newViewFlag
  }
}
```

AuxId[lId] equal to 0 specifies the layer with nuh_layer_id equal to lId does not contain auxiliary pictures. AuxId[lId] greater than 0 specifies the type of auxiliary pictures in layer with nuh_layer_id equal to lId as specified in Table 3 below.

TABLE 3

Mapping of AuxId to the type of auxiliary pictures

| AuxId | Name of AuxId | Type of auxiliary pictures | SEI message describing interpretation of auxiliary pictures |
|---|---|---|---|
| 1 | AUX_ALPHA | Alpha plane | Alpha channel information |
| 2 | AUX_DEPTH | Depth picture | Depth representation information |
| 3 . . . 127 | | Reserved | |
| 128 . . . 159 | | Unspecified | |
| 160 . . . 255 | | Reserved | |

The interpretation of auxiliary pictures associated with AuxId in the range of 128 to 159, inclusive, is specified through means other than the AuxId value.

AuxId[lId] is in the range of 0 to 2, inclusive, or 128 to 159, inclusive, for bitstreams conforming to this version of this Specification. Although the value of AuxId[lId] is in the range of 0 to 2, inclusive, or 128 to 159, inclusive, in this version of this Specification, decoders can allow values of AuxId[lId] in the range of 0 to 255, inclusive.

It is a requirement of bitstream conformance that when AuxId[lId] is equal to AUX_ALPHA or AUX_DEPTH, either of the following applies:
  chroma_format_idc is equal to 0 in the active SPS for the layer with nuh_layer_id equal to lId.

The value of all decoded chroma samples is equal to $1<<(BitDepthC-1)$ in all pictures that have nuh_layer_id equal to lId and for which this VPS RBSP is the active VPS RBSP.

SEI messages may describe the interpretation of auxiliary pictures, including their possible association with one or more primary pictures.

Unless constrained by the semantics of the SEI messages specifying the interpretation of auxiliary pictures, it is allowed to have two layers with nuh_layer_id values layerIdA and layerIdB such that AuxId[layerIdA] is equal to AuxId[layerIdB], both being greater than 0 and to have all values of ScalabilityId[LayerIdxInVps[layerIdA]][i] equal to ScalabilityId[LayerIdxInVps[layerIdB]][i] for each value of i in the range of 0 to 15, inclusive. SEI messages specifying the interpretation of auxiliary pictures may specify that a picture with nuh_layer_id equal to layerIdA and a picture with nuh_layer_id equal to layerIdB in the same access unit may both be associated with the same primary picture.

In VVC, auxiliary pictures are coded as one or more auxiliary picture layers different from primary picture layer. The indication of auxiliary is signaled in scalability dimension information SEI message as shown in Table 4 below.

TABLE 4

Syntax of scalability dimension information SEI message

| | Descriptor |
|---|---|
| scalability_dimension_info( payloadSize ) { | |
|   sdi_max_layers_minus1 | u(6) |
|   sdi_multiview_info_flag | u(1) |
|   sdi_auxiliary_info_flag | u(1) |
|   if( sdi_multiview_info_flag \|\| sdi_auxiliary_info_flag ) { | |
|     if( sdi_multiview_info_flag ) | |
|       sdi_view_id_len_minus1 | u(4) |
|     for( i = 0; i <= sdi_max_layers_minus1; i++ ) { | |
|       sdi_layer_id[ i ] | u(6) |
|       if( sdi_multiview_info_flag ) | |
|         sdi_view_id_val[ i ] | u(v) |
|       if( sdi_auxiliary_info_flag ) | |
|         sdi_aux_id[ i ] | u(8) |
|       if( sdi_aux_id[ i ] > 0 ) { | |
|         sdi_num_associated_primary_layers_minus1[ i ] | u(6) |
|         for( j = 0; j <= sdi_num_associated_primary_layers_minus1[ i ]; j++ ) | |
|           sdi_associated_primary_layer_idx[ i ][ j ] | u(6) |
|       } | |
|     } | |
|   } | |
| } | |

The scalability dimension information (SDI) SLI message provides the SDI for each layer in the current CVS, i.e., the CVS containing the SDI SLI message, such as 1) when there may be multiple views, the view ID of each layer; and 2) when there may be auxiliary information (such as depth or alpha) carried by one or more layers, the auxiliary ID of each layer.

When an SDI SLI message is present in any AU of a CVS, an SDI SLI message is present for the first AU of the CVS. All SDI SLI messages in a CVS have the same content.

sdi_max_layers_minus1 plus 1 indicates the maximum number of layers in the current CVS.

sdi_multiview_info_flag equal to 1 indicates that the current CVS may have multiple views and the sdi_view_id_val[ ] syntax elements are present in the SDI SEI message. sdi_multiview_info_flag equal to 0 indicates that the current CVS does not have multiple views and the sdi_view_id_val[ ] syntax elements are not present in the SDI SEI message.

sdi_auxiliary_info_flag equal to 1 indicates that one or more layers in the current CVS may be auxiliary layers, which carry auxiliary information, and the sdi_aux_id[ ] syntax elements are present in the SDI SEI message. sdi_auxiliary_info_flag equal to 0 indicates that the current CVS does not have an auxiliary layer and the sdi_aux_id[ ] syntax elements are not present in the SDI SEI message.

sdi_view_id_len_minus1 plus 1 specifies the length, in bits, of the sdi_view_id_val[i] syntax element.

sdi_layer_id[i] specifies the layer identifier of the $i^{th}$ layer that may be present in the current CVS.

sdi_view_id_val[i] specifies the view identifier of the $i^{th}$ layer in the current CVS. The length of the sdi_view_id_val[i] syntax element is sdi_view_id_len_minus1+1 bits.

The variable NumViews, specifying the number of views in the current CVS, and the list ViewId, specifying the view identifiers of the views in the current CVS, are derived as follows:

```
NumViews = 1
if( sdi_multiview_info_flag ) {
    ViewId[ 0 ] = sdi_view_id_val[ 0 ]
    for( i = 1; i <= sdi_max_layers_minus1; i++ ) {
        newViewFlag = 1
        for( j = 0; j < i; j++ )
            if( sdi_view_id_val[ i ] = = sdi_view_id_val[ j ] )
                newViewFlag = 0
        if( newViewFlag ) {
            ViewId[ NumViews ] = sdi_view_id_val[ i ]
            NumViews++
        }
    }
}
``` sdi_aux_id[i] equal to 0 indicates that the $i^{th}$ layer in the current CVS does not contain auxiliary pictures. sdi_aux_id[i] greater than 0 indicates the type of auxiliary pictures in the $i^{th}$ layer in the current CVS as specified in Table 5 below. When sdi_auxiliary_info_flag is equal to 0, the value of sdi_aux_id[i] is inferred to be equal to 0.

TABLE 5

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

The interpretation of auxiliary pictures associated with sdi_aux_id[i] in the range of 128 to 159, inclusive, is specified through means other than the sdi_aux_id[i] value.

sdi_aux_id[i] is in the range of 0 to 2, inclusive, or 128 to 159, inclusive, for bitstreams conforming to this version of this Specification. Although the value of sdi_aux_id[i] is in the range of 0 to 2, inclusive, or 128 to 159, inclusive, in this version of this Specification, decoders also allow other values of sdi_aux_id[i] in the range of 0 to 255, inclusive.

If sdi_aux_id[i] is equal to 0, the $i^{th}$ layer is referred to as a primary layer. Otherwise, the $i^{th}$ layer is referred to as an auxiliary layer. When sdi_aux_id[i] is equal to 1, the $i^{th}$ layer is also referred to as an alpha auxiliary layer. When sdi_aux_id[i] is equal to 2, the $i^{th}$ layer is also referred to as a depth auxiliary layer.

sdi_num_associated_primary_layers_minus1[i] plus 1 specifies the number of associated primary layers of $i^{th}$ layer, which is an auxiliary layer. The value of sdi_num_associated_primary_layers_minus1[i] is less than the total number of primary layers.

sdi_associated_primary_layer_idx[i][j] specifies the layer index of the $j^{th}$ associated primary layer of the it layer, which is an auxiliary layer. The value of sdi_aux_id[sdi_associated_primary_layer_idx[i][j]] is equal to 0.

An auxiliary layer describes a property of and applies to its associated primary layers.

The current AR SEI message can be used to annotate or track the object in the videos. But it has limited functionalities. For example, the current AR SEI message cannot sufficiently support the following two aspects.

In the current AR SEI message, the detected or tracked object is represented by a bounding box. The position information of the object can be described by the bounding box while the shape information of the object cannot be represented by the bounding box. To applications that use segmentation to facilitate functionalities such as virtual background, more accurate description of the object shape information is needed. And performing object segmentation is power consuming which is a big burden to mobile devices. Once object segmentation is performed, it may be desirable to carry such information in the video bitstream as side information. The syntax of the current AR SEI message as shown in Table 1 cannot carry such information.

Moreover, a flag is signaled in the current AR SEI message to indicate whether the object represented by the bounding box is partially visible or fully visible. However, in the case that the object is partially visible, there is no parameters to tell the decoder which part is visible and which part is occluded. So, the flag itself doesn't provide much information to the decoder to figure out the object's visible vs. invisible areas. Instead, object depth information may provide a better mechanism to describe the relative positions of different objects in the picture in terms of their distance to the camera. Such information can be directly used to derive which parts of which objects are occluded or not.

To solve the above problems, instead of signaling a bounding box for the annotated region, the mask is signaled to represent the shape and location of the object annotated or tracked. A mask can be implemented by a binary matrix with the same size as the picture, where an element with value 0 representing this position being covered by the background and an element with value 1 representing this position being covered by the object. Thus, any shape of the object could be represented by the mask. To distinguish different objects, a multiple-value mask can be used, where element with value 0 represent background, and element with value k (k is not equal to 0) representing the kl object.

The mask can represent accurate shape of the object, but the signaling overhead is also much larger than sending a bounding box. Thus, in this disclosure, it is proposed to code the mask as the auxiliary pictures instead of signaling the mask in SEI message, so that low level video coding technologies supported by video coding standard can be used to compress the mask pictures.

In this disclosure, there are one or more normal pictures at one time instance which are called primary pictures, and each primary picture is associated with one or more object mask auxiliary pictures. In H.264/AVS, auxiliary picture is indicated by a special NAL unit type. In H.265/HEVC and H.266/VVC, auxiliary picture is coded as auxiliary picture layer, another layer than primary picture layer. Thus, there can be multiple primary picture layers and multiple auxiliary picture layers.

To interpret the auxiliary picture, some side information is needed. In this disclosure, it is proposed to signal the side information about mask auxiliary picture in SEI message.

Figure 5:
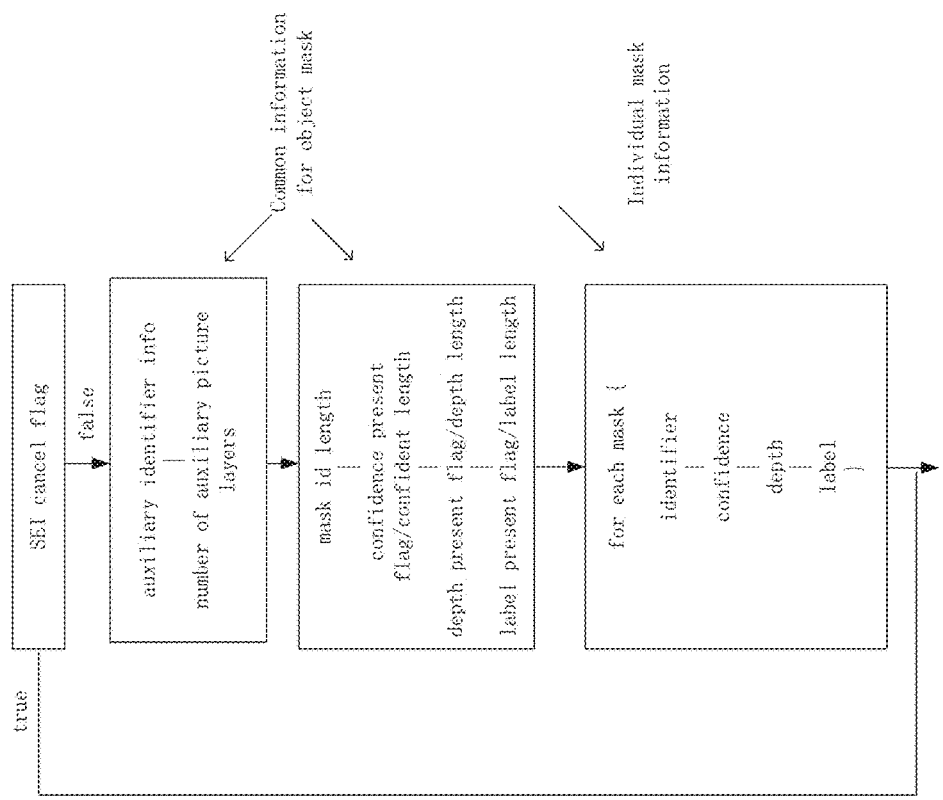
FIG. 5 is a syntax chart of an exemplary object mask information (OMI) SEI message, according to some embodiments of the present disclosure.

FIG. 5 is the syntax chart of the proposed object mask information (OMI) SEI message, according to some disclosed embodiments. The chart shows the syntax structure and syntax element order of the object mask information SEI message. First, a cancel flag is signaled to indicate whether this OMI SEI is used to cancel the persistence scope of a previous SEI message (e.g., the last OMI message). If the cancel flag indicates not to cancel the persistence scope of the previous OMI SEI message, the information about object mask is signaled to update the object information signaled in a previous OMI SEI message, among which the object mask auxiliary (picture) identifier information which is used to distinguish object mask auxiliary picture from other auxiliary pictures is signaled first. Then, the number of object mask pictures (e.g., auxiliary picture layers) is signaled. After that, the present flags (e.g., confidence present flag, depth present flag, or label present flag), and syntax elements of lengths of confidence, depth, and identifier (e.g., confident length, depth length, or label length), if any, are signaled. The syntax element signaled above are referred to as common information for object masks indicated by this OMI SEI message, while individual mask information is signal later. At last, for each mask in each object mask picture, mask identifier followed by mask confidence, object depth and mask label (if present) are signaled.

Figure 6:
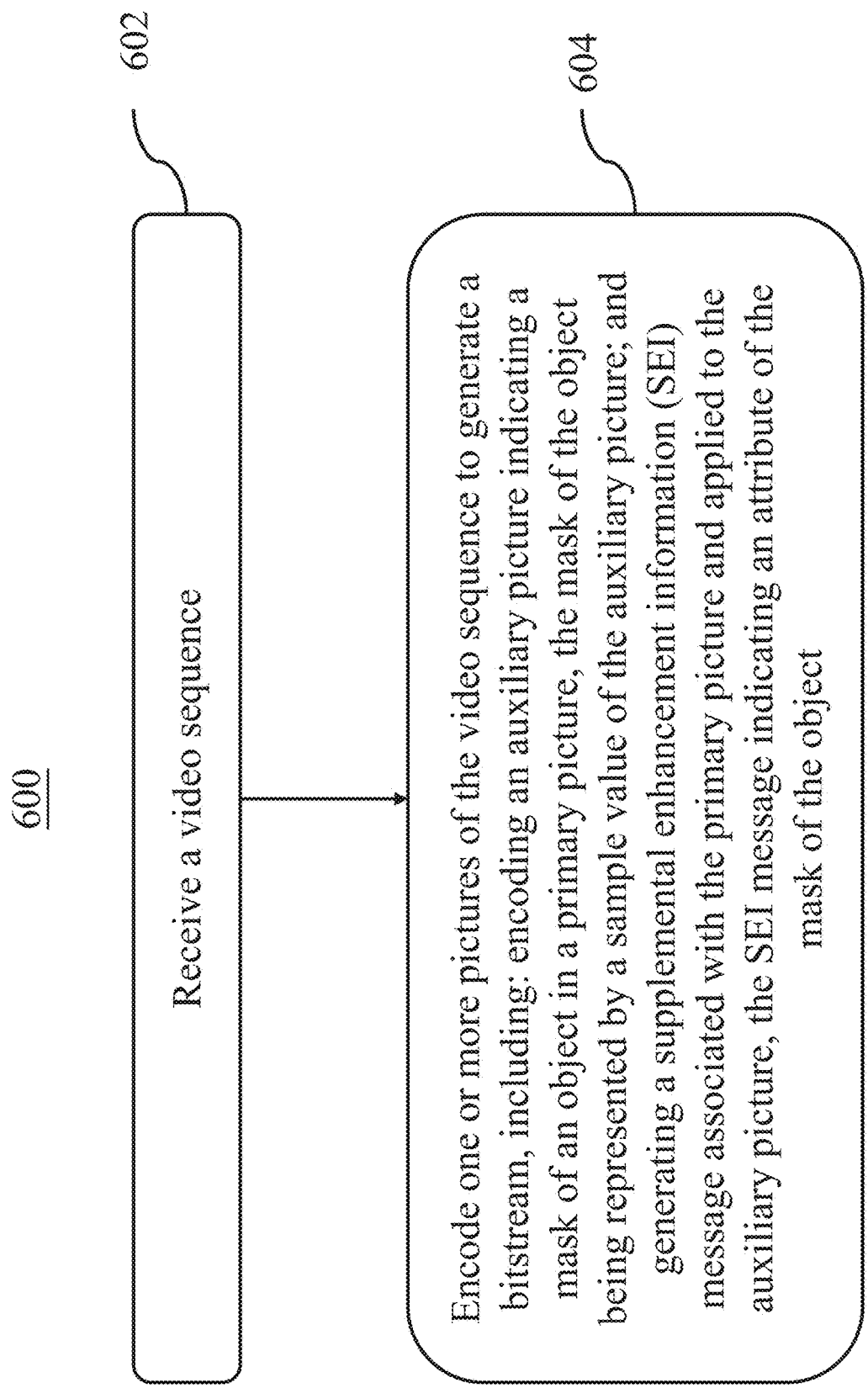
FIG. 6 is a schematic diagram illustrating an exemplary method for encoding a video sequence into a bitstream, consistent with embodiments of the disclosure.

FIG. 6 is a schematic diagram illustrating an exemplary method 600 for encoding a video sequence into a bitstream, consistent with embodiments of the disclosure. As shown in FIG. 6, method 600 includes steps 602 and 604, which can be implemented by an encoder (e.g., image/video encoder 124 in FIG. 1, or apparatus 400 in FIG. 4).

In step 602, the encoder can receive a video sequence.

In step 604, the encoder can encode one or more pictures of the video sequence to generate a bitstream. Specifically, the encoder may encode an auxiliary picture in the bitstream for indicating a mask of an object in a primary picture. The mask of the object can be represented by a sample value of the auxiliary picture. As appreciated, the object in the primary picture can be sketched by the mask filled pixels with the sample value. In addition, the encoder may generate a supplemental enhancement information (SEI) message associated with the primary picture. The SEI message also applies to the auxiliary picture and can be used to indicate an attribute of the mask of the object. In the present disclosure, the SEI message used to indicate attributes of the mask of an object is also referred to as an object mask information (OMI) SEI message.

Figure 7:
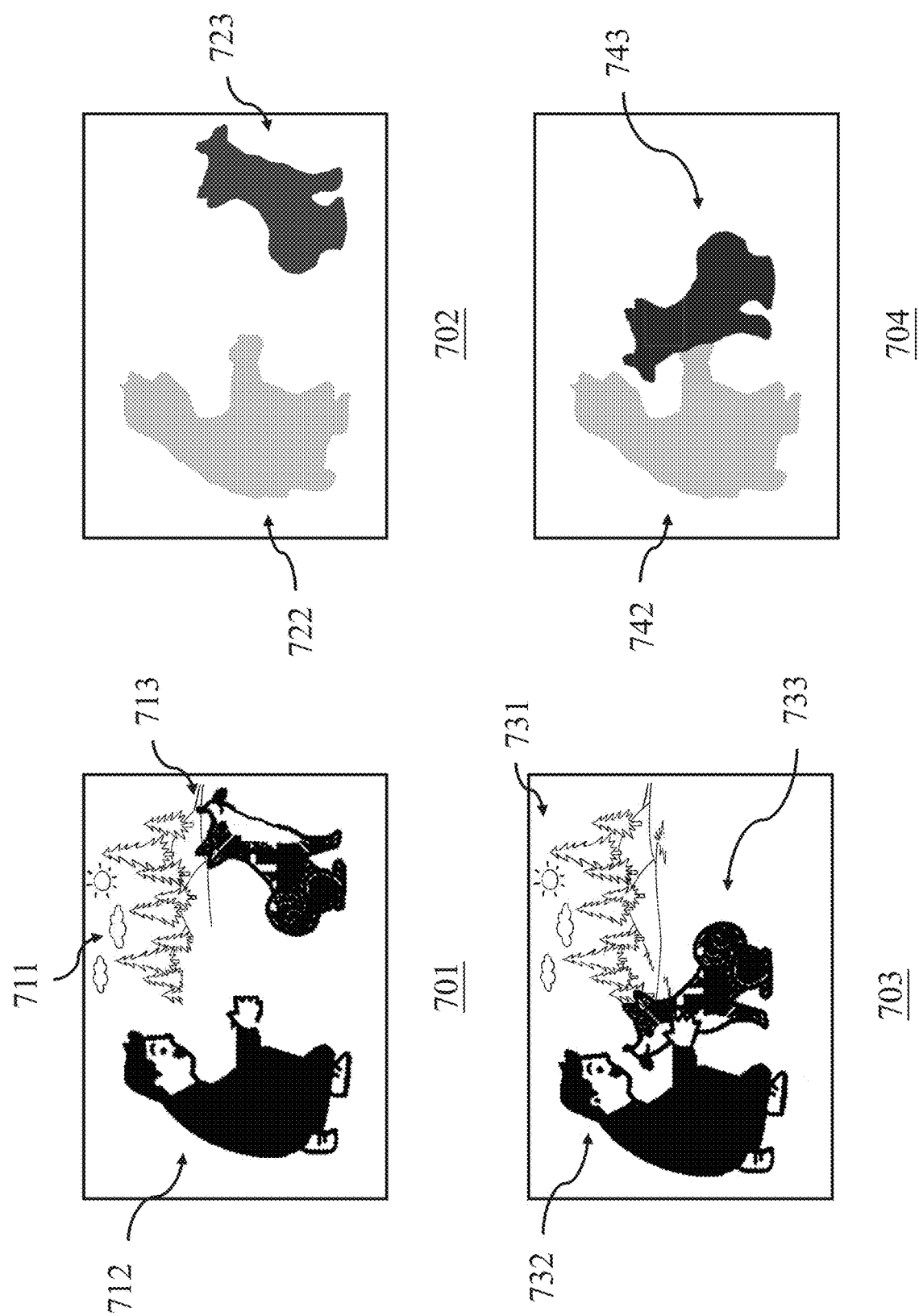
FIG. 7 is a schematic diagram illustrating exemplary primary pictures and auxiliary pictures, consistent with embodiments of the disclosure.

FIG. 7 is a schematic diagram illustrating exemplary primary pictures 701 and 703, and auxiliary pictures 702 and 704, consistent with embodiments of the disclosure. Auxiliary picture 702 corresponds to primary 701, while auxiliary picture 704 corresponds to primary 703. As shown in FIG. 7, primary picture 701 may include a background 711, a human object 712, and an animal object 713 in the picture. Auxiliary picture 702, which corresponds to primary picture 701, may include a human mask 722 corresponding to human object 712, and an animal mask 723 corresponding to animal object 713. Masks in auxiliary picture 702 can be used to represent the location and contour of respective objects in primary picture 701. Specifically, auxiliary picture 702 can be the same size as primary picture 701. Human mask 722 depicts the location and contour of human object 712 in primary picture 701 by its own location and contour in auxiliary picture 702. As appreciated, the masks in auxiliary picture 702 can be represented by respective sample values (also referred to as pixel values). Similarly, masks in auxiliary picture 704 can be used to represent the location and contour of respective objects in primary picture 703.

An OME SEI message (not shown) may apply to auxiliary picture 702 or 704 and can be used to indicate attribute(s) of at least one of the masks.

In some embodiments, each OMI SEI message contains the information about all the masks. As the persistency scheme is used for OMI SEI message, for a primary picture, if mask doesn't change at all from this time instance to the next time instance, OMI SEI needn't be signaled. If any information changes, a new OMI SEI containing the new information about masks needs to be signaled. The syntax is shown in Table 6, wherein the semantics are provided below in Table 6 as an example.

TABLE 6

Exemplary syntax of OMI SEI message

|  | Descriptor |
| --- | --- |
| Object_mask_info( payloadSize ) { |  |
|   omi_cancel_flag | u(1) |
|   if(!omi_cancel_flag) { |  |
| //high level info |  |
|     omi_aux_id_minus128 | ue(v) |
|     omi_num_mask_pic_minus1 | ue(v) |
|     omi_mask_id_length_minus8 | ue(v) |
|     omi_mask_confidence_info_present_flag | u(1) |
|     if( omi_mask_confidence_info_present_flag ) |  |
|       omi_mask_confidence_length_minus1 | u(4) |
|     omi_object_depth_info_present_flag | u(1) |
|     if( omi_mask_depth_info_present_flag ) |  |
|       omi_object_depth_length_minus1 | u(4) |
|     omi_mask_label_info_present_flag | u(1) |
|     if( omi_mask_label_info_present_flag ) { |  |
|       omi_mask_label_language_present_flag | u(1) |
|       if(omi_mask_label_language_present_flag) { |  |
|         while(!byte_aligned( )) |  |
|           omi_bit_equal_to_zero | f(1) |

TABLE 6-continued

Exemplary syntax of OMI SEI message

| | Descriptor |
|---|---|
|       omi_mask_label_language | st(v) |
|     } | |
|   } | |
| } | |
| // individual mask information | |
|   for (i=0; i<=omi_num_mask_pic_minus1; i++) { | |
|     omi_mask_pic_layer_id[ i ] | u(6) |
|     omi_num_mask_in_pic[ i ] | ue(v) |
|     for(j=0; j<omi_num_mask_in_pic[ i ]; j++) { | |
|       omi_mask_id[ i ] [ j ] | u(v) |
|       if( omi_mask_confidence_info_present_flag ) | |
|       omi_mask_confidence[ i ] [ j ] | u(v) |
|     if( omi_mask_depth_info_present_flag ) | |
|       omi_mask_depth[ i ] [ j ] | u(v) |
|       if(omi_mask_label_info_present_flag){ | |
|       while(!byte_aligned( )) | |
|         omi_bit_equal_to_zero | f(1) |
|       omi_mask_label[ i ] [ j ] | st(v) |
|       } | |
|     } | |
|   } | |
| } | |

The object mask information (OMI) SLI message provides information about object mask pictures coded as auxiliary pictures. Object mask auxiliary pictures have nuh_layer_id equal to nuhLayerIdA and AuxId[nuhLayerIdA] in range of 128 to 159, inclusive. Each overlay auxiliary picture layer is associated with one or more primary picture layers as specified below.

In some embodiments, the encoder may determine a cancel flag for indicating whether the SEI message cancels a persistence of a previous SEI message in step 604. For example, omi_cancel_flag equal to 1 indicates that the SEI message cancels the persistence of any previous object mask information SEI message in output order that is associated with one or more primary picture layers to which this SEI applies. omi_cancel_flag equal to 0 indicates that object mask information follows, and object mask information signaled in this SEI message would be used to update the present object mask information of any previous SEI message.

It is appreciated that if the cancel flag (e.g., omi_cancel_flag) indicates that the SEI message cancels the persistence of any SEI message, then only the cancel flag is contained and signaled in the SEI message. When it is decided to utilize the mask information again, a complete SEI message with all necessary syntax need to be generated and signaled to the decoder.

The SEI message may indicate attributes of a plurality of masks. In some embodiments, the attribute of the mask conveyed by the SEI message may include common features of each of masks indicated by the SEI message and individual features of the mask of the object. As appreciated, the common features are shared by these masks indicated by the SEI message, while the individual features are specified to a target mask.

The encoder may further determine the common features and the individual features in step 604 if the cancel flag (e.g., omi_cancel_flag) indicates that the SEI message does not cancel the persistence of information of the previous SEI message.

As described above by referring to FIG. 5, the common features can be object mask auxiliary (picture) identifier information, the number of object mask pictures, the present flags, and lengths of confidence, depth, and identifier (e.g., confident length, depth length, or label length), if any.

The identifier of the auxiliary picture to which the SEI message applies can be determined as one of the common features. For example, omi_aux_id_minus128 plus 128 indicates the value of AuxId of object mask auxiliary pictures. omi_aux_id_minus128 is in the range of 0 to 31, inclusive.

The number of bits used for coding identifier of any of the plurality of masks can be determined as one of the common features. For example, omi_num_mask_pic_minus1 plus 1 indicates the number of object mask auxiliary pictures associated with the same one or more primary picture. The value of omi_num_mask_pic_minus1 is in the range of 0 to 63, inclusive. The value of omi_num_mask_pic_minus1 is the same in all OMI SEI message within a CVS.

In some embodiments, the SEI message applies to a plurality of auxiliary pictures. The number of the plurality of auxiliary pictures can be determined as one of the common features. For example, omi_mask_id_length_minus8 plus 8 indicates the number of bits used for coding omi_mask_id [i][j] syntax elements.

A confidence present flag, which is used for indicating whether confidence information of the plurality of masks is comprised in the SEI message, can be determined as one of the common features. For example, omi_mask_confidence_info_present_flag equal to 1 indicates that omi_mask_confidence[i][j] syntax elements are present. omi_mask_confidence_info_present_flag equal to 0 indicates that omi_mask_confidence[i][j]syntax elements are not present. It is a requirement of bitstream conformance that the value of omi_mask_confidence_info_present_flag is the same for all object_mask_info( ) syntax structures within a CLVS.

In some embodiments, if the confidence present flag (e.g., omi_mask_confidence_info_present_flag) indicates that the confidence information of the plurality of masks is comprised in the SEI message, then the length of the confidence information of the plurality of masks can be also determined as one of the common features. For example, omi_mask_confidence_length_minus1 plus 1 specifies the length, in bits, of the omi_mask_confidence[i][j] syntax elements. It is a requirement of bitstream conformance that the value of omi_mask_confidence_length_minus1 is the same for all object_mask_info ( ) syntax structures within a CLVS.

A depth present flag, which is used for indicating whether depth information of the plurality of masks is comprised in the SEI message, can be determined as one of the common features. For example, omi_object_depth_info_present_flag equal to 1 indicates that omi_object_depth[i][j] syntax elements are present. omi_object_depth_info_present_flag equal to 0 indicates that omi_object_depth[i][j] syntax elements are not present. It is a requirement of bitstream conformance that the value of omi_object_depth_info_present_flag is the same for all object_mask_info( ) syntax structures within a CLVS.

In some embodiments, if the depth present flag (e.g., omi_object_depth_info_present_flag) indicates that depth information of the plurality of masks is comprised in the SEI message, then the length of the depth information of the plurality of masks can be determined as one of the common features. For example, omi_object_depth_length_minus1 plus 1 specifies the length, in bits, of the omi_object_depth [i][j] syntax elements. It is a requirement of bitstream conformance that the value of omi_object_depth_length_minus1 is the same for all object_mask_info ( ) syntax structures within a CLVS.

A label present flag, which is used for indicating whether label language presence information and label information of the plurality of masks are comprised in the SEI message, can be determined as one of the common features. For example, omi_mask_label_info_present_flag equal to 1 indicates that omi_mask_label_language_present_flag and omi_mask_label[i][j] are present. omi_mask_label_info_present_flag equal to 0 indicates that omi_mask_label_language_present_flag and omi_mask_label[i] [j] are not present.

In some embodiments, if the label present flag (e.g., omi_mask_label_info_present_flag) indicates that the label language presence information and the label information of the plurality of masks are comprised in the SEI message, then a language present flag, which is used for indicating whether label language information of the plurality of masks is comprised in the SEI message, can be determined as one of the common features. For example, omi_mask_label_language_present_flag equal to 1 indicates that omi_mask_label_language is present. omi_mask_label_language_present_flag equal to 0 indicates that omi_mask_label_language is not present, and that the language of the mask label is unspecified.

In some embodiments, omi_bit_equal_to_zero is equal to 0.

In some embodiments, if the language present flag indicates that the label language information of the plurality of masks is comprised in the SEI message, then a label language information of the plurality of masks can be determined as one of the common features. For example, omi_mask_label_language contains a language tag as specified by IETF RFC 5646 followed by a null termination byte equal to 0x00. The length of the omi_mask_label_language syntax element is less than or equal to 255 bytes, not including the null termination byte. When not present, the language of the label is unspecified.

As described above by referring to FIG. 5, the individual features can be mask identifier, mask confidence, object depth and mask label (if present) for each mask in each object mask picture. As described above, the number of the plurality of auxiliary pictures can be determined as one of the common features when the SEI message applies to a plurality of auxiliary pictures. Moreover, the SEI message may comprise the individual features generated for masks represented by the plurality of auxiliary pictures.

In some embodiments, an individual feature omi_mask_pic_layer_id [i] indicates the nuh_layer_id value of the $i^{th}$ auxiliary picture layer. AuxId[omi_mask_pic_layer_id [i]] is equal to omi_aux_id_minus128+128 for all values of in the range of 0 to omi_num_mask_pic_minus1, inclusive.

In some embodiments, an individual feature omi_num_mask_in_pic[i] indicates the number of masks in the $i^{th}$ auxiliary picture. omi_num_mask_in_pic[i] is in the range of 0 to (1<<BitDepthY)−1, inclusive, where BitDepthY is the bit depth for the samples of the luma component.

In some embodiments, an individual feature omi_mask_id [i][j] indicates the identifier of $j^{th}$ object mask in the $i^{th}$ object mask auxiliary picture. The object mask identifier associated with the sample location (x, y) in the $i^{th}$ object mask auxiliary picture is equal to p[i] [x][y] where p[i][x][y] refers to the luma sample at location (x, y) in the decoded $i^{th}$ object mask auxiliary picture.

The variable maskId[i][j] specifying the object mask identifier of $j^{th}$ object mask of the it object mask auxiliary picture in the SEI message is derived as follows,

```
for( i = 0; i <= omi_num_mask_pic_minus1; i++ ) {
  for( j = 0; j <= omi_num_mask_in_pic[ i ]; j++ ) {
    maskId[ i ][ j ] += omi_mask_id[ i ] [ j ] * (i+1)
  }
}
```

In some embodiments, an individual feature omi_mask_confidence[i][j] indicates the degree of confidence associated with the $j^{th}$ object mask in the $i^{th}$ object mask auxiliary picture, in units of $2^{-(omi\_mask\_confidence\_length\_minus1+1)}$, such that a higher value of omi_mask_confidence[i][j][k] indicates a higher degree of confidence. The length of the omi_mask_confidence[i][j] [k] syntax element is omi_mask_confidence_length_minus1+1 bits.

In some embodiments, an individual feature omi_mask_depth[i][j] indicates the object depth associated with the $j^{th}$ object mask in the $i^{th}$ object mask auxiliary picture. A smaller value of omi_mask_depth indicates a shorter distance to the object. The length of the omi_mask_depth[i][j][k] syntax element is omi_object_depth_length_minus1+1 bits.

In some embodiments, an individual feature omi_mask_label[i][j] specifies the contents of the label associated with $j^{th}$ object mask in the $i^{th}$ object mask auxiliary picture. The length of the omi_mask_label[i][j] syntax element is less than or equal to 255 bytes, not including the null termination byte.

In the syntax described in Table 6, whenever the object mask information changes, all the mask information including unchanged part need to be re-signaled in OMI SEI message, which takes a lot of bit costs. In some embodiments, only the changed information is signaled. FIG. 8 is a schematic diagram illustrating the sub-steps of method 600. As shown in FIG. 8, step 604 may include sub-steps 802 and 804, which can be implemented by the encoder.

In sub-step 802, the encoder can determine whether the mask of the object is different from a previous mask of the object represented by a previous auxiliary picture when the cancel flag indicates that the SEI message cancels the persistence of information of the previous SEI message. In some embodiments, the encoder can determine whether the mask of the object is different from the previous mask of the object represented by the previous auxiliary picture regardless of whether the cancel flag indicates that the SEI message cancels the persistence of information of the previous SEI message.

In sub-step 804, the encoder can encode the attribute of the mask of the object in the SEI message when the mask of the object is different from the previous mask of the object. In some embodiments, the encode may skip encode the attribute of the mask of the object in the SEI message when the mask of the object is the same as the previous mask of the object.

In some embodiments, an update flag can be introduced for each auxiliary picture. If there is nothing changed for an object mask auxiliary picture, the mask information signaling of this auxiliary picture is skipped. If there is something changed, the changed information is signaled. For example, if the label, depth or confidence of an object mask changes, or the number of masks changes, only the changed mask needs to be signaled. Thus, the signaling overhead is reduced. Referring back to FIG. 7, human mask 742 in auxiliary 704 and human mask 722 in auxiliary 702 are the same, while animal mask 723 changes to animal mask 743. If a previous SEI is signaled for indicating masks 722 and 723, a current SEI to be signaled for indicating masks 742 and 743 may skip the unchanged information (e.g., human mask 742).

The syntax is shown in Table 7 (the differences from Table 6 are italicized in Table 7), wherein the semantics are provided below in Table 7 as an example. The definitions of common features denoted as "high level info" and the individual features denoted as "individual mask information", some of which are omitted, can be inherited from the embodiments described above with shared parameter/function names.

TABLE 7

Exemplary syntax of OMI SEI message

| | Descriptor |
|---|---|
| Object_mask_info( payloadSize ) { | |
|   omi_cancel_flag | u(1) |
|   if(!omi_cancel_flag) { | |
| //high level info | |
|     omi_aux_id_minus128 | ue(v) |
|     omi_num_mask_pic_minus1 | ue(v) |
|     omi_mask_id_length_minus8 | ue(v) |
|     omi_mask_confidence_info_present_flag | u(1) |
|     if( omi_mask_confidence_info_present_flag ) | |
|       omi_mask_confidence_length_minus1 | u(4) |
|     omi_object_depth_info_present_flag | u(1) |
|     if( omi_mask_depth_info_present_flag ) | |
|       omi_object_depth_length_minus1 | u(4) |
|     omi_mask_label_info_present_flag | u(1) |
|     if( omi_mask_label_info_present_flag ) { | |
|       omi_mask_label_language_present_flag | u(1) |
|       if(omi_mask_label_language_present_flag) { | |
|         while(!byte_aligned( )) | |
|           omi_bit_equal_to_zero | f(1) |
|         omi_mask_label_language | st(v) |
|       } | |
|     } | |
| // individual mask information | |
|     for (i=0; i<=omi_num_mask_pic_minus1; i++) { | |
|       *omi_mask_pic_update_flag[ i ]* | *f(1)* |
|       *if(omi_mask_pic_update_flag[ i ]) {* | |
|         omi_mask_pic_layer_id[ i ] | u(6) |
|         *omi_num_mask_in_pic_update [ i ]* | *ue(v)* |
|         for(j=0; j<*omi_num_mask_in_pic_update*[ i ]; j++) { | |
|           omi_mask_id[ i ] [ j ] | u(v) |
|           *if(maskIdExist[i][omi_mask_id[ i ] [ j ]]) {* | |
|             omi_mask_cancel[ i ] [ j ] | u(1) |
|             *maskIdExist[i][omi_mask_id[ i ]* | |
| *[ j ]]= !omi_mask_cancel[ i ] [ j ]* | |
|           } | |
|           *else* | |
|             *maskIdExist[i][omi_mask_id[ i ] [ j ]]=1* | |
|           if(maskIdExist[i][omi_mask_id[ i ] [ j ]]) { | |
|           if( omi_mask_confidence_info_present_flag ) | |
|             omi_mask_confidence[ i ] [ j ] | u(v) |
|           if( omi_mask_depth_info_present_flag ) | |
|             omi_mask_depth[ i ] [ j ] | u(v) |
|           if(omi_mask_label_info_present_flag){ | |
|             while(!byte_aligned( )) | |
|               omi_bit_equal_to_zero | f(1) |
|             omi_mask_label[ i ] [ j ] | st(v) |
|           } | |
|         } | |
|       } | |
|     } | |
|   } | |
| } | |

The object mask information (OMI) SEI message provides information about object mask pictures coded as auxiliary pictures. Object mask auxiliary pictures have nuh_layer_id equal to nuhLayerIdA and AuxId[nuhLayerIdA] in range of 128 to 159, inclusive. Each overlay auxiliary picture layer is associated with one or more primary picture layers as specified below.

Similar to some of the embodiments described above, the encoder may determine a cancel flag for indicating whether the SEI message cancels a persistence of a previous SEI message in step 604. For example, omi_cancel_flag equal to 1 indicates that the SEI message cancels the persistence of any previous object mask information SEI message in output order that is associated with one or more primary picture layers to which this SEI applies. omi_cancel_flag equal to 0 indicates that object mask information follows, and object mask information signaled in this SEI message would be used to update the present object mask information of any previous SEI message.

Similarly, the encoder may determine other common features for the mask as well.

omi_aux_id_minus128 plus 128 indicates the value of AuxId of object mask auxiliary pictures. omi_aux_id_minus128 is in the range of 0 to 31, inclusive.

omi_num_mask_pic_minus1 plus 1 indicates the number of object mask auxiliary pictures associated with the same one or more primary picture. The value of omi_num_mask_pic_minus1 is in the range of 0 to 63, inclusive. The value of omi_num_mask_pic_minus1 is the same in all OMI SEI message within a CVS.

omi_mask_id_length_minus8 plus 8 indicates the number of bits used for coding omi_mask_id[i][j] syntax elements.

omi_msak_confidence_info_present_flag equal to 1 indicates that omi_mask_confidence[i][j] syntax elements are present. omi_mask_confidence_info_present_flag equal to 0 indicates that omi_mask_confidence[i][j] syntax elements are not present. It is a requirement of bitstream conformance that the value of omi_mask_confidence_info_present_flag is the same for all object_mask_info( ) syntax structures within a CLVS.

omi_mask_confidence_length_minus1 plus 1 specifies the length, in bits, of the omi_mask_confidence[i][j] syntax elements. It is a requirement of bitstream conformance that the value of omi_mask_confidence_length_minus1 is the same for all object_mask_info ( ) syntax structures within a CLVS.

omi_object_depth_info_present_flag equal to 1 indicates that omi_object_depth[i][j] syntax elements are present. omi_object_depth_info_present_flag equal to 0 indicates that omi_object_depth[i][j] syntax elements are not present. It is a requirement of bitstream conformance that the value of omi_object_depth_info_present_flag is the same for all object_mask_info( ) syntax structures within a CLVS.

omi_object_depth_length_minus1 plus 1 specifies the length, in bits, of the omi_object_depth[i][j] syntax elements. It is a requirement of bitstream conformance that the value of omi_object_depth_length_minus1 is the same for all object_mask_info ( ) syntax structures within a CLVS.

omi_mask_label_info_present_flag equal to 1 indicates that omi_mask_label_language_present_flag and omi_mask_label[i][j] are present. omi_mask_label_info_present_flag equal to 0 indicates that omi_mask_label_language_present_flag and omi_mask_label[i][j] are not present.

omi_mask_label_language_present_flag equal to 1 indicates that omi_mask_label_language is present. omi_mask_label_language_present_flag equal to 0 indicates that omi_mask_label_language is not present, and that the language of the mask label is unspecified.

omi_bit_equal_to_zero is equal to 0.

omi_mask_label_language contains a language tag as specified by IETF RFC 5646 followed by a null termination byte equal to 0x00. The length of the omi_mask_label_language syntax element is less than or equal to 255 bytes, not including the null termination byte. When not present, the language of the label is unspecified.

In some embodiments, the encoder can determine an update flag for indicating whether the mask of the object is signaled in an auxiliary picture. For example, omi_mask_pic_update_flag[i] equal to 1 indicates the mask information of $i^{th}$ object mask auxiliary picture is signaled. omi_mask_pic_update_flag[i] equal to 0 indicates the mask information of ii object mask auxiliary picture is not signaled. When the mask information of ii object mask auxiliary picture is not present, the persistence mechanism is used, that is the information is inherited from the last OMI SEI message which signals the mask information of $i^{th}$ object mask auxiliary picture.

omi_mask_pic_layer_id [i] indicates the nuh_layer_id value of the $i^{th}$ auxiliary picture layer. AuxId[omi_mask_pic_layer_id [i]] is equal to omi_aux_id_minus128+128 for all values of in the range of 0 to omi_num_mask_pic_minus1, inclusive.

In some embodiments, omi_num_mask_in_pic_update[i] indicates the number of masks in the $i^{th}$ auxiliary picture to be signaled. omi_num_mask_in_pic[i] is in the range of 0 to (1<<BitDepthY)−1, inclusive, where BitDepthY is the bit depth for the samples of the luma component.

In some embodiments, omi_mask_id[i][j] indicates the identifier of $j^{th}$ object mask to be updated in the $i^{th}$ object mask auxiliary picture.

The object mask identifier associated with the sample location (x, y) in the it object mask auxiliary picture is equal to p[i][x][y] where p[i][x][y] refers to the luma sample at location (x, y) in the decoded $i^{th}$ object mask auxiliary picture.

The variable maskId[i][j] specifying the object mask identifier of $j^{th}$ object mask of the it object mask auxiliary picture in the SEI message is derived as follows,

```
for( i = 0; i <= omi_num_mask_pic_minus1; i++ ) {
    for( j = 0; j <= omi_num_mask_in_pic[ i ]; j++ ) {
        maskId[ i ][ j ] += omi_mask_id[ i ] [ j ] * (i+1)
    }
}
```

In some embodiments, the encoder may determine a mask cancel flag for indicating whether the mask of the object cancels a persistence of a previous mask of the object, when the cancel flag indicates that the SEI message does not cancel the persistence of information of the previous SEI message. In some embodiments, the encoder may determine a mask cancel flag for indicating whether the mask of the object cancels a persistence of a previous mask of the object regardless of whether the cancel flag indicates that the SEI message cancels the persistence of information of the previous SEI message. For example, omi_mask_cancel[i][j] equal to 1 cancels the persistence scope of object mask with identifier equal to omi_mask_id[i][j]. omi_mask_cancel[i][j] equal to 0 indicates the information of object mask with identifier equal to omi_mask_id[i][j] is signaled.

The variable maskIdExist[i][id] equal to 1 indicates the object mask with identifier id in the it object mask auxiliary picture exists. The variable maskIdExist[i][id] equal to 0 indicates the object mask with identifier id in the it object mask auxiliary picture does not exist. maskIdExist[i][id] is initialized with 0 before decoding the current CVS.

omi_mask_confidence[i][j] indicates the degree of confidence associated with the $j^{th}$ object mask to be updated in the $i^{th}$ object mask auxiliary picture, in units of $2^{-(omi\_mask\_confidence\_length\_minus1+1)}$, such that a higher value of omi_mask_confidence[i][j][k] indicates a higher degree of confidence. The length of the omi_mask_confidence [i][j][k] syntax element is omi_mask_confidence_length_minus1+1 bits.

omi_mask_depth[i][j] indicates the object depth associated with the $j^{th}$ object mask to be updated in the $i^{th}$ object mask auxiliary picture. A smaller value of omi_mask_depth indicates a shorter distance to the object. The length of the omi_mask_depth[i][j][k] syntax element is omi_object_depth_length_minus1+1 bits.

omi_mask_label[i][j] specifies the contents of the label associated with $j^{th}$ object mask to be updated in the $i^{th}$ object mask auxiliary picture. The length of the omi_mask_label [i][j] syntax element is less than or equal to 255 bytes, not including the null termination byte.

In the embodiments associated with Table 6 and Table 7, it is assumed that one or more primary picture layers are already determined and only the layer identifier of each object mask picture layer is indicated in OMI SEI message. And it is also assumed that all the object mask picture layers are associated with the one or more primary picture layers, so there is no need to signal the primary picture layers with which the object mask auxiliary picture layer is associated.

However, VVC supports multiple primary picture layers and multiple auxiliary picture layers. An auxiliary picture layer can be associated with more than one primary picture layer and one primary picture can be associated with more than one auxiliary picture layer. The NAL unit layer identifier of primary picture layer and auxiliary picture layer is specified in SDI SEI message. And for each auxiliary picture layer, the primary picture layer with which it is associated with is also specified in SDI SEI message. Referring back to FIG. 7, an OMI SEI message can be used to indicate the masks of auxiliary pictures 702 and 704. Hence, the OMI SEI message is associated with primary pictures 701 and 703. In some embodiments, primary pictures 701 may correspond to more than one auxiliary picture, which can be also indicated by the OMI SEI message.

As in VVC there are multiple primary picture layers and OMI SEI message may be only applied to some of these primary picture layers, the number of primary picture layers and the layer identifier of each primary picture layer to which OMI SEI message is applied are signaled in OMI SEI message. According to SDI SEI message, there is no need to signal layer identifier of object mask auxiliary picture layer in OMI SEI message after the primary picture layer is determined. As layer identifier of the auxiliary picture which is associated with a primary picture layer with layer identifier layerIdA can be derived based on SDI SEI message.

The variable numAuxLayer[i] indicated the number of the auxiliary picture layers associated with primary picture layer with nuh_layer_id (nuh_layer_id is the syntax element name of layer identifier) equal to i. The variable associatedAuxLayer[j][i] indicates the value of nuh_layer_id of $i^{th}$ auxiliary picture layer associated with primary picture layer with nuh_layer_id equal to j. numAuxLayer[i] and associatedAuxLayer[j][i] are derived by SDI SEI message as follows.

```
for(i=0; i<=sdi_max_max_layers_minus1;i++){
   numAuxLayer[sdi_layer_id[i]]=0;
}
for(i=0; i<=sdi_max_max_layers_minus1;i++){
   if(sdi_aux_id[i]== omi_aux_id_minus128+128){
     for(j=0;j< sdi_num_associated_primary_layers_minus1[ i ];j++){
        primaryLayerId= sdi_layer_id[sdi_associated_primary_layer_idx[ i ][ j ]];
   associatedAuxLayer[primaryLayerId][NumAuxLayer[primaryLayerId]]= sdi_layer_id[i]
        numAuxLayer[primaryLayerId]++;
     }
   }
}
```

The OMI SEI message is shown as Table 8, and the semantics are provided below in Table 8 as an example. The definitions of common features denoted as "high level info" and the individual features denoted as "individual mask information", some of which are omitted, can be inherited from the embodiments described above with shared parameter/function names.

TABLE 8

Exemplary syntax of OMI SEI message

| | Descriptor |
|---|---|
| Object_mask_info( payloadSize ) { | |
|   omi_cancel_flag | u(1) |
|   if(!omi_cancel_flag) { | |
| //high level info | |
|     omi_aux_id_minus128 | ue(v) |
|     omi_num_primary_pic_layer_minu1 | ue(v) |
|     for(i=0; i<=omi_num_primary_pic_layer_minus1;i++) | |
|       omi_primary_pic_layer_id[i] | ue(v) |
|     omi_mask_id_length_minus8 | ue(v) |
|     omi_mask_confidence_info_present_flag | u(1) |
|     if( omi_mask_confidence_info_present_flag ) | |

TABLE 8-continued

Exemplary syntax of OMI SEI message

| | Descriptor |
|---|---|
| omi_mask_confidence_length_minus1 | u(4) |
| omi_mask_depth_info_present_flag | u(1) |
| if( omi_mask_depth_info_present_flag ) | |
|   omi_mask_depth_length_minus1 | u(4) |
| omi_mask_label_info_present_flag | u(1) |
| if( omi_mask_label_info_present_flag ) { | |
|   omi_mask_label_language_present_flag | u(1) |
|   if(omi_mask_label_language_present_flag) { | |
|     while(!byte_aligned( )) | |
|       omi_bit_equal_to_zero | f(1) |
|     omi_mask_label_language | st(v) |
|   } | |
| } | |
| // individual mask information | |
|   for (i=0; i<= omi_num_primary_pic_layer_minus1; i++) { | |
|     for(j=0;j< numAuxLayer[omi_primary_pic_layer_id[i]]; j+=){ | u(1) |
|       omi_num_mask_in_pic [ i ][ j ] | u(6) |
|       for(k=0; j<omi_num_mask_in_pic[ i ] [ j ]; k++) { | |
|         omi_mask_id[ i ][ j ][ k ] | u(v) |
|         if( omi_mask_confidence_info_present_flag ) | |
|         omi_mask_confidence[ i ] [ j ] [ k ] | u(v) |
|         if( omi_mask_depth_info_present_flag ) | |
|         omi_mask_depth[ i ] [ j ] [ k ] | u(v) |
|         if(omi_mask_label_info_present_flag){ | |
|         while(!byte_aligned( )) | |
|           omi_bit_equal_to_zero | f(1) |
|         omi_mask_label[ i ] [ j ] [k] | st(v) |
|       } | |
|     } | |
|   } | |
| } | |

The object mask information (OMI) SEI message provides information about object mask pictures coded as auxiliary pictures. Object mask auxiliary pictures have nuh_layer_id equal to nuhLayerIdA, sdi_layer_id[i] equal to nuhLayerIdA and sdi_aux_id [ii] in the range of 128 to 159, inclusive, for any value of i in range of 0 to sid_max_layers_minus1, inclusive.

When an access unit contains an auxiliary picture picA in a layer, with nuh_layer_id equal to nuhLayerIdA, that is indicated as an object mask auxiliary layer by an OMI SEI message, a primary picture picB in a layer, with nuh_layer_id equal to nuhLayerIdB, that is indicated as a primary layer by the OMI SEI message, OMI SEI message persists in output order until one or more of the following conditions are true:

A CLVS containing the auxiliary picture picA ends.

A CLVS containing the primary picture picB ends.

A CVS ends.

The bitstream ends.

The value of sdi_aux_id[sdi_associated_primary_layer_idx[i][j]] is equal to 0.

omi_cancel_flag equal to 1 indicates that the SEI message cancels the persistence of any previous object mask information SEI message in output order that is associated with one or more primary picture layers to which this SEI applies. omi_cancel_flag equal to 0 indicates that object mask information follows, and object mask information signaled in this SEI message would be used to update the present object mask information of any previous SEI message.

omi_aux_id_minus128 plus 128 indicates the value of sdi_aux_id of object mask auxiliary pictures. omi_aux_id_minus128 is in the range of 0 to 31, inclusive.

When a CVS does not contain an SDI SEI message with sdi_aux_id[i] equal to omi_aux_id_minus128+128 for at least one value of i, no picture in the CVS is associated with an OMI SEI message.

When an AU contains both an SDI SEI message with sdi_aux_id[i] equal to omi_aux_id_minus128+128 for at least one value of i and an OMI SEI message, the SDI SEI message precedes the OMI SEI message in decoding order.

In some embodiments, the SEI message is associated with a plurality of primary pictures corresponding to the auxiliary pictures to which the SEI message applies. a number of the plurality of primary pictures and the layer identifiers of the plurality of primary pictures can be determined as the common features. For example, omi_num_primary_pic_layer_minus1 plus 1 indicates the number of primary picture layers associated with the object mask auxiliary picture layers to which this SEI message applies. The value of omi_num_primary_pic_layer_minus1 is in the range of 0 to sdi_max_layers_minus1.

In addition, omi_primary_pic_layer_id[i] specifies the nuh_layer_id value of the $i^{th}$ primary picture layer to which this OMI SEI message applies. The value of sdi_aux_id[j] is equal to 0 for any value of j in the range of 0 to sid_max_layers_minus1 so that sdi_layer_id[j] equal to omi_primary_pic_layer_id[i]

omi_mask_id_length_minus8 plus 8 indicates the number of bits used for coding omi_mask_id[i][j][k] syntax elements.

omi_mask_confidence_info_present_flag equal to 1 indicates that omi_mask_confidence[i][j][k] syntax elements are present. omi_mask_confidence_info_present_flag equal to 0 indicates that omi_mask_confidence[i][j][k] syntax elements are not present. It is a requirement of bitstream conformance that the value of omi_mask_confidence_info_present_flag is the same for all object_mask_info( ) syntax structures within a CLVS.

omi_mask_confidence_length_minus1 plus 1 specifies the length, in bits, of the omi_mask_confidence[i][j][k] syntax elements. It is a requirement of bitstream conformance that the value of omi_mask_confidence_length_minus1 is the same for all object_mask_info( ) syntax structures within a CLVS.

omi_object_depth_info_present_flag equal to 1 indicates that omi_object_depth[i][j][k] syntax elements are present. omi_object_depth_info_present_flag equal to 0 indicates that omi_object_depth[i][j][k] syntax elements are not present. It is a requirement of bitstream conformance that the value of omi_object_depth_info_present_flag is the same for all object_mask_info( ) syntax structures within a CLVS.

omi_object_depth_length_minus1 plus 1 specifies the length, in bits, of the omi_object_depth[i][j][k] syntax elements. It is a requirement of bitstream conformance that the value of omi_object_depth_length_minus1 is the same for all object_mask_info( ) syntax structures within a CLVS.

omi_mask_label_info_present_flag equal to 1 indicates that omi_mask_label_language_present_flag and omi_mask_label[i][j][k] are present. omi_mask_label_info_present_flag equal to 0 indicates that omi_mask_label_language_present_flag and omi_mask_label[i][j][k] are not present.

omi_mask_label_language_present_flag equal to 1 indicates that omi_mask_label_language is present. omi_mask_label_language_present_flag equal to 0 indicates that omi_mask_label_language is not present, and that the language of the mask label is unspecified.

omi_bit_equal_to_zero is equal to 0.

omi_mask_label_language contains a language tag as specified by IETF RFC 5646 followed by a null termination byte equal to 0x00. The length of the omi_mask_label_language syntax element is less than or equal to 255 bytes, not including the null termination byte. When not present, the language of the label is unspecified.

omi_num_mask_in_pic[i][j] indicates the number of masks in the $j^{th}$ object mask auxiliary picture associated with the $j^{th}$ primary picture. omi_num_mask_in_pic[i][j] is in the range of 0 to (1<<BitDepthY)−1, inclusive, where BitDepthY is the bit depth for the samples of the luma component.

In some embodiments, the encoder may determine the number of the auxiliary pictures corresponding to each of the plurality of primary pictures. Then, the encoder can determine the individual features for the masks represented by the auxiliary pictures for each of the plurality of primary pictures.

For example, an individual feature omi_mask_id[i][j][k] indicates the identifier of $k^{th}$ object mask in the $j^{th}$ object mask auxiliary picture associated with it primary picture. The object mask identifier associated with the sample location (x, y) in the $j^{th}$ object mask auxiliary picture is equal to p[j][x][y] where p[j][x][y] refers to the luma sample at location (x, y) in the decoded $j^{th}$ object mask auxiliary picture.

The variable maskId[i][j] specifying the object mask identifier of $k^{th}$ object mask of the $j^{th}$ object mask auxiliary picture associated with $i^{th}$ primary picture in the SEI message is derived as follows,

```
for( i = 0; i <= omi_num_primary_pic_layer_minus1; i++ ) {
  for( j = 0; j<= numAuxLayer[omi_primary_pic_layer_id[i]]; j++ ) {
    for(k = 0; k <= omi_num_mask_in_pic[ i ]; k++ ) {
      maskId[ i ][ j ][ k ] += omi_mask_id[ i ] [ j ][k] * (j+1)
    }
  }
}
``` omi_mask_confidence[i][j][k] indicates the degree of confidence associated with the $k^{th}$ object mask in the $j^{th}$ object mask auxiliary picture associated with it primary picture, in units of $2^{-(omi\_mask\_confidence\_length\_minus1+1)}$, such that a higher value of omi_mask_confidence[i][j][k] indicates a higher degree of confidence. The length of the omi_mask_confidence[i][j][k] syntax element is omi_mask_confidence_length_minus1+1 bits.

omi_mask_depth[i][j][k] indicates the object depth associated with the $k^{th}$ object mask in the $j^{th}$ object mask auxiliary picture associated with $i^{th}$ primary picture. A smaller value of omi_mask_depth indicates a shorter distance to the object. The length of the omi_mask_depth[i][j][k] syntax element is omi_object_depth_length_minus1+1 bits.

omi_mask_label[i][j][k] specifies the contents of the label associated with $k^{th}$ object mask in the $j^{th}$ object mask auxiliary picture associated with $i^{th}$ primary picture. The length of the omi_mask_label[i][j][k] syntax element is less than or equal to 255 bytes, not including the null termination byte.

In some embodiments, similar to Table 7, OMI SEI message may only signal the mask information to be updated. And for the unchanged information between this OMI SEI message and previous OMI SEI message, the signaling can be skipped to save the bit overhead. The syntax is shown below as Table 9 (the differences from Table 6 are italicized in Table 9). The definitions of common features denoted as "high level info" and the individual features denoted as "individual mask information", some of which are omitted, can be inherited from the embodiments described above with shared parameter/function names.

TABLE 9

Exemplary syntax of OMI SEI message

| | Descriptor |
|---|---|
| Object_mask_info( payloadSize ) { | |
|   omi_cancel_flag | u(1) |
|   if(!omi_cancel_flag) { | |
| //high level info | |
|     omi_aux_id_minus128 | ue(v) |
|     omi_num_primary_pic_layer_minus1 | ue(v) |
|     for(i=0; i<=omi_num_primary_pic_layer_minus1;i++) | |
|       omi_primary_pic_layer_id[i] | ue(v) |
|     omi_mask_id_length_minus8 | ue(v) |

TABLE 9-continued

Exemplary syntax of OMI SEI message

| | Descriptor |
|---|---|
| omi_mask_confidence_info_present_flag | u(1) |
| if( omi_mask_confidence_info_present_flag ) | |
|     omi_mask_confidence_length_minus1 | u(4) |
| omi_mask_depth_info_present_flag | u(1) |
| if( omi_mask_depth_info_present_flag ) | |
|     omi_mask_depth_length_minus1 | u(4) |
| omi_mask_label_info_present_flag | u(1) |
| if( omi_mask_label_info_present_flag ) { | |
|     omi_mask_label_language_present_flag | u(1) |
|     if(omi_mask_label_language_present_flag) { | |
|       while(!byte_aligned( )) | |
|         omi_bit_equal_to_zero | f(1) |
|       omi_mask_label_language | st(v) |
|     } | |
| } | |
| // individual mask information | |
|     for (i=0; i<= omi_num_primary_pic_layer; i++) { | |
|       for(j=0;j< numAuxLayer[omi_primary_pic_layer_id[i]]; j++){ | u(1) |
|       omi_mask_pic_update_flag[ i ][ j ] | f(1) |
|       if(omi_mask_pic_update_flag[ i ] [ j ]) { | |
|         omi_num_mask_in_pic_update [ i ] [ j ] | ue(v) |
|         for(k=0; k<omi_num_mask_in_pic_update[ i ] [ j ]; k++) { | |
|           omi_mask_id[ i ] [ j ] [k ] | u(v) |
|           if(maskIdExist[i][ j ][omi_mask_id[ i ] [ j ] [ k ]]) { | |
|             omi_mask_cancel[ i ] [ j ] [ k ] | u(1) |
|             maskIdExist[i] [ j ] [omi_mask_id[ i ] [ j ] [ k ]]= !omi_mask_cancel[ i ] [ j ] [ k ] | |
|           } | |
|           else { | |
|             maskIdExist[i] [ j ] [omi_mask_id[ i ] [ j ] [ k ]]=1 | |
|           } | |
|           if(maskIdExist[i] [ j ] [omi_mask_id[ i ] [ j ] [ k ]]) { | |
|             if( omi_mask_confidence_info_present_flag ) | |
|               omi_mask_confidence[ i ] [ j ] [ k ] | u(v) |
|             if( omi_mask_depth_info_present_flag ) | |
|               omi_mask_depth[ I ] [ j ] [ k ] | u(v) |
|             while(!byte_aligned( )) | |
|             omi_bit_equal_to_zero | f(1) |
|             if(omi_mask_label_info_present_flag) | |
|               omi_mask_label[ i ] [ j ] [ k ] | st(v) |
|           } | |
|         } | |
|       } | |
|     } | |
| } | |

The variable numAuxLayer[i] indicated the number of the auxiliary picture layers associated with primary picture layer with nuh_layer_id equal to i. The variable associatedAuxLayer[j][i] indicates the value of nuh_layer_id of $i^{th}$ auxiliary picture layer associated with primary picture layer with nuh_layer_id equal to j. numAuxLayer[i] and associatedAuxLayer[j][i] are derived by SDI SEI message as follows.

auxiliary pictures. Object mask auxiliary pictures have nuh_layer_id equal to nuhLayerIdA, sdi_layer_id[i] equal to nuhLayerIdA and sdi_aux_id [i] in the range of 128 to 159, inclusive, for any value of i in range of 0 to sid_max_layers_minus1, inclusive.

When an access unit contains an auxiliary picture picA in a layer, with nuh_layer_id equal to nuhLayerIdA, that is indicated as an object mask auxiliary layer by an OMI SEI

```
for(i=0; i<=sdi_max_max_layers_minus1;i++){
   numAuxLayer[sdi_layer_id[i]]=0;
}
for(i=0; i<=sdi_max_max_layers_minus1;i++){
   if(sdi_aux_id[i]== omi_aux_id_minus128+128){
      for(j=0;j< sdi_num_associated_primary_layers_minus1[ i ];j++){
         primaryLayerId= sdi_layer_id[sdi_associated_primary_layer_idx[ i ][ j ]];
associatedAuxLayer[primaryLayerId][NumAuxLayer[primaryLayerId]]= sdi_layer_id[i]
         numAuxLayer[primaryLayerId]++;
      }
   }
}
```

The object mask information (OMI) SEI message provides information about object mask pictures coded as message, a primary picture picB in a layer, with nuh_layer_id equal to nuhLayerIdB, that is indicated as a primary layer by the OMI SEI message, OMI SEI message persists in output order until one or more of the following conditions are true:
- A CLVS containing the auxiliary picture picA ends.
- A CLVS containing the primary picture picB ends.
- A CVS ends.
- The bitstream ends.

The value of sdi_aux_id[sdi_associated_primary_layer_idx[i][j]] is equal to 0.

omi_cancel_flag equal to 1 indicates that the SEI message cancels the persistence of any previous object mask information SEI message in output order that is associated with one or more primary picture layers to which this SEI applies. omi_cancel_flag equal to 0 indicates that object mask information follows, and object mask information signaled in this SEI message would be used to update the present object mask information of any previous SEI message.

omi_aux_id_minus128 plus 128 indicates the value of sdi_aux_id of object mask auxiliary picture layer. omi_aux_id_minus128 is in the range of 0 to 31, inclusive.

When a CVS does not contain an SDI SEI message with sdi_aux_id[i] equal to omi_aux_id_minus128+128 for at least one value of i, no picture in the CVS is associated with an OMI SEI message.

When an AU contains both an SDI SEI message with sdi_aux_id[i] equal to omi_aux_id_minus128+128 for at least one value of i and an OMI SEI message, the SDI SEI message precedes the OMI SEI message in decoding order.

omi_num_primary_pic_layer_minus1 plus 1 indicates the number of primary picture layers associated with the object mask auxiliary picture layers to which this SEI message applies. The value of omi_num_primary_pic_layer_minus1 is in the range of 0 to sdi_max_layers_minus1.

omi_primary_pic_layer_id[i] specifies the nuh_layer_id value of the $i^{th}$ primary picture layer to which this OMI SEI message applies. The value of sdi_aux_id[j] is equal to 0 for any value of j in the range of 0 to sid_max_layers_minus1 so that sdi_layer_id[j] equal to omi_primary_pic_layer_id[i]

omi_mask_id_length_minus8 plus 8 indicates the number of bits used for coding omi_mask_id[i][j][k] syntax elements.

omi_mask_confidence_info_present_flag equal to 1 indicates that omi_mask_confidence[i][j][k] syntax elements are present. omi_mask_confidence_info_present_flag equal to 0 indicates that omi_mask_confidence[i][j][k] syntax elements are not present. It is a requirement of bitstream conformance that the value of omi_mask_confidence_info_present_flag is the same for all object_mask_info( ) syntax structures within a CLVS.

omi_mask_confidence_length_minus1 plus 1 specifies the length, in bits, of the omi_mask_confidence[i][j][k] syntax elements. It is a requirement of bitstream conformance that the value of omi_mask_confidence_length_minus1 is the same for all object_mask_info( ) syntax structures within a CLVS.

omi_object_depth_info_present_flag equal to 1 indicates that omi_object_depth[i][j][k] syntax elements are present. omi_object_depth_info_present_flag equal to 0 indicates that omi_object_depth[i][j][k] syntax elements are not present. It is a requirement of bitstream conformance that the value of omi_object_depth_info_present_flag is the same for all object_mask_info( ) syntax structures within a CLVS.

omi_object_depth_length_minus1 plus 1 specifies the length, in bits, of the omi_object_depth[i][j][k] syntax elements. It is a requirement of bitstream conformance that the value of omi_object_depth_length_minus1 is the same for all object_mask_info( ) syntax structures within a CLVS.

omi_mask_label_info_present_flag equal to 1 indicates that omi_mask_label_language_present_flag and omi_mask_label[i][j][k] are present. omi_mask_label_info_present_flag equal to 0 indicates that omi_mask_label_language_present_flag and omi_mask_label[i][j][k] are not present.

omi_mask_label_language_present_flag equal to 1 indicates that omi_mask_label_language is present. omi_mask_label_language_present_flag equal to 0 indicates that omi_mask_label_language is not present, and that the language of the mask label is unspecified.

omi_bit_equal_to_zero is equal to 0.

omi_mask_label_language contains a language tag as specified by IETF RFC 5646 followed by a null termination byte equal to 0x00. The length of the omi_mask_label_language syntax element is less than or equal to 255 bytes, not including the null termination byte. When not present, the language of the label is unspecified.

omi_mask_pic_update_flag[i][j] equal to 1 indicates the mask information of $j^{th}$ object mask auxiliary picture associated with it primary picture is signaled. omi_mask_pic_update_flag[i][j] equal to 0 indicates the mask information of $j^{th}$ object mask auxiliary picture associated with $i^{th}$ primary picture is not signaled. When the mask information of $j^{th}$ object mask auxiliary picture associated with it primary picture is not present, the persistence mechanism is used, that is the information is inherited from the last OMI SEI message which signals the mask information of $j^{th}$ object mask auxiliary picture associated with $i^{th}$ primary picture.

omi_num_mask_in_pic_update[i][j] indicates the number of object masks in the $j^{th}$ auxiliary picture associated with $i^{th}$ primary picture to be signaled. omi_num_mask_in_pic[i][j] is in the range of 0 to (1<<BitDepthY)−1, inclusive, where BitDepthY is the bit depth for the samples of the luma component.

omi_mask_id[i][j][k] indicates the identifier of $k^{th}$ object mask in the $j^{th}$ object mask auxiliary picture associated with it primary picture. The object mask identifier associated with the sample location (x, y) in the $j^{th}$ object mask auxiliary picture is equal to p[j][x][y] where p[j][x][y] refers to the luma sample at location (x, y) in the decoded $j^{th}$ object mask auxiliary picture.

The variable maskId[i][j][k] specifying the object mask identifier of k object mask of the $j^{th}$ object mask auxiliary picture associated with it primary picture in the SEI message is derived as follows,

```
for( i = 0; i <= omi_num_primary_pic_layer_minus1; i++ ) {
  for( j = 0; j<= numAuxLayer[omi_primary_pic_layer_id[i]]; j++ ) {
    for(k = 0; k <= omi_num_mask_in_pic[ i ]; k++ ) {
      maskId[ i ][ j ][ k ] += omi_mask_id[ i ] [ j ][k] * (j+1)
    }
  }
}
``` omi_mask_cancel[i][j][k] equal to 1 cancels the persistence scope of object mask with identifier equal to omi_mask_id[i][j][k]. omi_mask_cancel[i][j][k] equal to 0 indicates the information of object mask with identifier equal to omi_mask_id[i][j] is signaled.

The variable maskIdExist[i][j][k] equal to 1 indicates the object mask with identifier k in the $j^{th}$ object mask auxiliary picture associated with it primary picture exists. The variable maskIdExist[i][j][k] equal to 0 indicates the object mask with identifier equal to k in the $j^{th}$ object mask auxiliary picture associate with $i^{th}$ primary picture does not exist. maskIdExist[i][j][k] is initialized with 0 before decoding the current CVS.

omi_mask_confidence[i][j][k] indicates the degree of confidence associated with the $k^{th}$ object mask in the $j^{th}$ object mask auxiliary picture associated with $i^{th}$ primary picture, in units of $2^{-(omi\_mask\_confidence\_length\_minus1+1)}$, such that a higher value of omi_mask_confidence[i][j][k] indicates a higher degree of confidence. The length of the omi_mask_confidence[i][j][k] syntax element is omi_mask_confidence_length_minus1+1 bits.

omi_mask_depth[i][j][k] indicates the object depth associated with the $k^{th}$ object mask in the $j^{th}$ object mask auxiliary picture associated with $i^{th}$ primary picture. A smaller value of omi_mask_depth indicates a shorter distance to the object. The length of the omi_mask_depth[i][j][k] syntax element is omi_object_depth_length_minus1+1 bits.

omi_mask_label[i][j][k] specifies the contents of the label associated with $k^{th}$ object mask in the $j^{th}$ object mask auxiliary picture associated with $i^{th}$ primary picture. The length of the omi_mask_label[i][j][k] syntax element is less than or equal to 255 bytes, not including the null termination byte.

In some of the above embodiments discussed in connection with Table 7 and Table 9, to save the bit overhead, only the updated object mask information is signaled. omi_mask_cancel[i][j][k], which indicates whether the mask with ID equal to omi_mask_id[i][j][k] is canceled, is only signaled when the mask with ID equal to omi_mask_id[i][j][k] already exists. Thus, the decoder has to maintain an object mask ID list to derive variable maskIdExist[i][j][omi_mask_id[i][j][k]], to determine if the object mask with ID equal to omi_mask_id[i][j][k] exists to parse syntax elements. This introduces parsing dependence on the previous SEI message.

In some embodiments, omi_mask_cancel[i][j][k] is always signaled. Moreover, if the mask object with ID equal to omi_mask_id[i][j][k] doesn't exist before, the value of omi_mask_cancel[i][j][k] is forced to be 0, which indicates the persistence scope of object mask with ID equal to omi_mask_cancel[i][j][k] is not canceled. The syntax of this method is shown below as Table 10 (the differences from Table 6 are italicized in Table 10). The definitions of common features denoted as "high level info" and the individual features denoted as "individual mask information", some of which are omitted, can be inherited from the embodiments described above with shared parameter/function names.

TABLE 10

| Syntax of OMI SEI message | |
|---|---|
| | Descriptor |
| Object_mask_info( payloadSize ) { | |
|   omi_cancel_flag | u(1) |
|   if(!omi_cancel_flag) { | |
| //high level info | |
|   ... | ue(v) |
| // individual mask information | |
|   for (i=0; i<= omi_num_primary_pic_layer; i++) { | |
|     for(j=0;j< numAuxLayer[omi_primary_pic_layer_id[i]]; j++){ | u(1) |
|     omi_mask_pic_update_flag[ i ][ j ] | f(1) |
|     if(omi_mask_pic_update_flag[ i ] [ j ]) { | |
|       omi_num_mask_in_pic_update[ i ] [ j ] | ue(v) |
|       for(k=0; k<omi_num_mask_in_pic_update[ i ] [ j ]; k++) { | |
|         omi_mask_id[ i ] [ j ] [ k ] | u(v) |
|         omi_mask_cancel[ i ] [ j ] [ k ] | |
|         if(!omi_mask_cancel[ i ] [ j ] [ k ]) { | |
|           if( omi_mask_confidence_info_present_flag ) | |
|             omi_mask_confidence[ i ] [ j ] [ k ] | u(v) |
|           if( omi_mask_depth_info_present_flag ) | |
|             omi_mask_depth[ I ] [ j ] [ k ] | u(v) |
|           while(!byte_aligned( )) | |
|             omi_bit_equal_to_zero | f(1) |
|           if(omi_mask_label_info_present_flag) | |
|             omi_mask_label[ i ] [ j ] [ k ] | st(v) |
|         } | |
|       } | |
|     } | |
|   } | |
| } | |

The variable numAuxLayer[li] indicated the number of the auxiliary picture layers associated with primary picture layer with nuh_layer_id equal to i. The variable associatedAuxLayer[j][i] indicates the value of nuh_layer_id of $i^{th}$ auxiliary picture layer associated with primary picture layer with nuh_layer_id equal to j. numAuxLayer[li] and associatedAuxLayer[j][i] are derived by SDI SLI message as follows.

```
for(i=0; i<=sdi_max_max_layers_minus1;i++){
    numAuxLayer[sdi_layer_id[i]]=0;
}
for(i=0; i<=sdi_max_max_layers_minus1;i++){
    if(sdi_aux_id[i]== omi_aux_id_minus128+128){
```

```
    for(j=0;j< sdi_num_associated_primary_layers_minus1[ i ];j++){
        primaryLayerId= sdi_layer_id[sdi_associated_primary_layer_idx[ i ][ j ]];
associatedAuxLayer[primaryLayerId][NumAuxLayer[primaryLayerId]]= sdi_layer_id[i]
        numAuxLayer[primaryLayerId]++;
      }
    }
}
```

The object mask information (OMI) SEI message provides information about object mask pictures coded as auxiliary pictures. Object mask auxiliary pictures have nuh_layer_id equal to nuhLayerIdA, sdi_layer_id[i] equal to nuhLayerIdA and sdi_aux_id [i] in the range of 128 to 159, inclusive, for any value of i in range of 0 to sid_max_layers_minus1, inclusive.

When an access unit contains an auxiliary picture picA in a layer, with nuh_layer_id equal to nuhLayerIdA, that is indicated as an object mask auxiliary layer by an OMI SEI message, a primary picture picB in a layer, with nuh_layer_id equal to nuhLayerIdB, that is indicated as a primary layer by the OMI SEI message, OMI SEI message persists in output order until one or more of the following conditions are true:

A CLVS containing the auxiliary picture picA ends.
A CLVS containing the primary picture picB ends.
A CVS ends.
The bitstream ends.

The value of sdi_aux_id[sdi_associated_primary_layer_idx[i][j]] shall be equal to 0.

omi_cancel_flag equal to 1 indicates that the SEI message cancels the persistence of any previous object mask information SEI message in output order that is associated with one or more primary picture layers to which this SEI applies. omi_cancel_flag equal to 0 indicates that object mask information follows, and object mask information signaled in this SEI message would be used to update the present object mask information of any previous SEI message.

omi_mask_pic_update_flag[i][j] equal to 1 indicates the mask information of $j^{th}$ object mask auxiliary picture associated with it primary picture is signaled. omi_mask_pic_update_flag[i][j] equal to 0 indicates the mask information of $j^{th}$ object mask auxiliary picture associated with $i^{th}$ primary picture is not signaled. When the mask information of $j^{th}$ object mask auxiliary picture associated with it primary picture is not present, the persistence mechanism is used, that is the information is inherited from the last OMI SEI message which signals the mask information of $j^{th}$ object mask auxiliary picture associated with $i^{th}$ primary picture.

omi_num_mask_in_pic_update[i][j] indicates the number of object masks in the $j^{th}$ auxiliary picture associated with it primary picture to be signaled. omi_num_mask_in_pic[i][j] shall be in the range of 0 to (1<<BitDepthY)−1, inclusive, where BitDepthY is the bit depth for the samples of the luma component.

omi_mask_id[i][j][k] indicates the identifier of $k^{th}$ object mask in the $j^{th}$ object mask auxiliary picture associated with it primary picture. The object mask identifier associated with the sample location (x, y) in the $j^{th}$ object mask auxiliary picture is equal to p[j][x][y] where p[j][x][y] refers to the luma sample at location (x, y) in the decoded $j^{th}$ object mask auxiliary picture.

The variable maskId[i][j][k] specifying the object mask identifier of $k^{th}$ object mask of the $j^{th}$ object mask auxiliary picture associated with it primary picture in the SEI message is derived as follows.

```
for( i = 0; i <= omi_num_primary_pic_layer_minus1; i++ ) {
  for( j = 0; j <= numAuxLayer[omi_primary_pic_layer_id[i]]; j++ ) {
    for(k = 0; k <= omi_num_mask_in_pic[ i ]; k++ ) {
      maskId[ i ][ j ][ k ] += omi_mask_id[ i ] [ j ][k] * (j+1)
    }
  }
}
``` omi_mask_cancel[i][j][k] equal to 1 cancels the persistence scope of object mask with identifier equal to omi_mask_id[i][j][k]. omi_mask_cancel[i][j][k] equal to 0 indicates the information of object mask with identifier equal to omi_mask_id[i][j] is signaled.

When maskIdExist[i][j][k] is equal to 0, the value of omi_mask_cancel[i][j][k] shall be equal to 1. When omi_mask_id[i][j][k] has a particular value equal to omiMaskId for the first time in the CLVS, the value of omi_mask_cancel[i][j][k] shall be equal to 0.

The variable maskIdExist[i][j][k] is derived as: maskIdExist[i][j][k] is initialized with 0 before decoding the current CVS. maskIdExist[i][j][omi_mask_id[i][j][k]] =!omi_mask_cancel[i][j][k].

omi_mask_confidence[i][j][k] indicates the degree of confidence associated with the $k^{th}$ object mask in the $j^{th}$ object mask auxiliary picture associated with it primary picture, in units of $2^{-(omi\_mask\_confidence\_length\_minus1+1)}$, such that a higher value of omi_mask_confidence[i][j][k] indicates a higher degree of confidence. The length of the omi_mask_confidence[i][j][k] syntax element is omi_mask_confidence_length_minus1+1 bits.

omi_mask_depth[i][j][k] indicates the object depth associated with the $k^{th}$ object mask in the $j^{th}$ object mask auxiliary picture associated with $i^{th}$ primary picture. A smaller value of omi_mask_depth indicates a shorter distance to the object. The length of the omi_mask_depth[i][j][k] syntax element is omi_object_depth_length_minus1+1 bits.

omi_mask_label[i][j][k] specifies the contents of the label associated with $k^{th}$ object mask in the $j^{th}$ object mask auxiliary picture associated with $i^{th}$ primary picture. The length of the omi_mask_label[i][j][k] syntax element shall be less than or equal to 255 bytes, not including the null termination byte.

In some of the above embodiments, the pixel value of object mask auxiliary picture represents the mask ID. The decoder determines the mask based on the decoded sample value of the object mask auxiliary picture. So, the encoder has to use lossless coding to encode the object mask auxiliary picture otherwise the mask will be distorted. However, in some cases, the number of object masks is much less than the range of sample values. Hence, in some embodiments, the sample values of the auxiliary picture can be encoded in a lossy manner. So, given the object mask IDs, for the decoded sample value different from any of object mask IDs, the decoder can recover the decoded sample value to the nearest mask ID values.

maskID[i] (with i=0 to n−1) indicates the $i^{th}$ object mask ID in a picture, and suppose maskID[i]<=maskID[j] if i<j. The tolerance boundary is calculated as:

$$th[i] = (maskID[i] + maskID[i+1])/2, i = 0 \ldots n-2$$

p[x][y] denotes the decoded value of sample with coordinator (x, y), the mask ID associated with p[x][y], ID(p[x][y]) is derived as:

```
if(p[x][y]<=th[0])
    ID(p[x][y])=maskID[0];
else if(p[x][y]>th[n−2])
    ID(p[x][y])=maskID[n−1]
else
{
for(i =1; i<n−2; i++)
{
    if(p[x][y] > th[i−1] && p[x][y] < th[i])
    {
        ID(p[x][y])=maskID[i]
        break;
    }
}
}
```

In some embodiments, a bounding box is signaled for each object mask to locate the object. For example, the encoder may determine a bounding box encompassing the mask of the object in step 604 when the cancel flag indicates that the SEI message does not cancel a persistence of information of the previous SEI message and encode the bounding box in the SEI message. In some embodiments, the encoder may determine a bounding box encompassing the mask of the object in step 604 regardless of whether the cancel flag indicates that the SEI message cancels the persistence of information of the previous SEI message. Thus, on the decoder side, only the samples within the bounding box are checked, and for the samples outside of the bounding box, no matter what their values are, the samples are treated as background. The coordinators of the bounding box of the object mask signaled is defined on the cropped part of the decoded picture, relative to the conformance cropping window specified by the active SPS. Additionally, to give the flexibility to the encoder to decide whether to signal the bounding box to delimit the mask or not to signal the bounding box for saving the bit overhead, a gating flag omi_mask_bounding_box_present_flag is added to make the signaling of bounding box parameters optional.

The syntax of this method is shown below as Table 11 (the differences from Table 6 are italicized in Table 11). The definitions of common features denoted as "high level info" and the individual features denoted as "individual mask information", some of which are omitted, can be inherited from the embodiments described above with shared parameter/function names.

TABLE 11

| Syntax of OMI SEI message | |
|---|---|
| | Descriptor |
| object_mask_info( payloadSize ) { | |
|   omi_cancel_flag | u(1) |
|   if( !omi_cancel_flag ) { | |
| //high level info | |
|   ... | |
|   omi_mask_size_length_minus1 | ue(v) |
| // individual mask information | |
|   for( i = 0; i <= omi_num_primary_pic_layer; i++ ) { | |
|     for( j = 0; j < numAuxLayer[ omi_primary_pic_layer_id[ i ] ]; j++ ){ | u(1) |
|       omi_mask_pic_update_flag[ i ][ j ] | f(1) |
|       if( omi_mask_pic_update_flag[ i ][ j ]) { | |
|         omi_num_mask_in_pic_update[ i ][ j ] | ue(v) |
|         for( k = 0; k < omi_num_mask_in_pic_update[ i ][ j ]; k++ ) { | |
|           omi_mask_id[ i ][ j ][ k ] | u(v) |
|           *omi_mask_bounding_box_present flag[ i ][ j ][ k ]* | *u(1)* |
|           *if (omi_mask_bounding_box_present_flag[ i ][ j ][ k ]) {* | |
|             *omi_mask_top[ i ][ j ][ k ]* | *u(v)* |
|             *omi_mask_left[ i ][ j ][ k ]* | *u(v)* |
|             *omi_mask_width[ i ][ j ][ k ]* | *ue(v)* |
|             *omi_mask_height[ i ][ j ][ k ]* | *ue(v)* |
|           *}* | |
|           if( maskIdExist[ i ][ j ][ omi_mask_id[ i ][ j ][ k ] ] ) { | |
|             omi_mask_cancel[ i ][ j ][ k ] | u(1) |
|             maskIdExist[ i ][ j ][ omi_mask_id[ i ][ j ][ k ] ]= !omi_mask_cancel[ i ] [ j ][ k ] | |
|           } | |
|           else | |
|             maskIdExist[ i ][ j ][ omi_mask_id[ i ][ j ][ k ] ] = 1 | |
|           if( maskIdExist[ i ][ j ][ omi_mask_id[ i ][ j ][ k ] ] ) { | |
|             if( omi_mask_confidence_info_present_flag ) | |
|               omi_mask_confidence[ i ][ j ][ k ] | u(v) |
|             if( omi_mask_depth_info_present_flag ) | |
|               omi_mask_depth[ i ][ j ][ k ] | u(v) |
|           while( !byte_aligned( ) ) | |

TABLE 11-continued

Syntax of OMI SEI message

| | Descriptor |
|---|---|
| omi_bit_equal_to_zero<br>if( omi_mask_label_info_present_flag )<br>    omi_mask_label[ i ][ j ][ k ]<br>   }<br>  }<br> }<br>}<br>} | f(1)<br><br>st(v) |

The variable numAuxLayer[i] indicates the number of the auxiliary picture layers associated with primary picture layer with nuh_layer_id equal to i. The variable associatedAuxLayer[j][i] indicates the value of nuh_layer_id of $i^{th}$ auxiliary picture layer associated with primary picture layer with nuh_layer_id equal to j. numAuxLayer[i] and associatedAuxLayer[j][i] are derived by SDI SEI message as follows.

```
for( i = 0; i <= sdi_max_max_layers_minus1; i++ ) {
   numAuxLayer[ sdi_layer_id[ i ] ] = 0;
}
for( i = 0; i <= sdi_max_layers_minus1; i++ ){
   if( sdi_aux_id[ i ] == omi_aux_id_minus128 + 128 ){
      for( j = 0; j < sdi_num_associated_primary_layers_minus1[ i ]; j++ ) {
         primaryLayerId = sdi_layer_id[ sdi_associated_primary_layer_idx[ i ][ j ] ];
         associatedAuxLayer[ primaryLayerId ][ numAuxLayer[ primaryLayerId ] ] = sdi_layer_id[ i ];
         numAuxLayer[ primaryLayerId ]++;
      }
   }
}
```

The object mask information (OMI) SEI message provides information about object mask pictures coded as auxiliary pictures. Object mask auxiliary pictures have nuh_layer_id equal to nuhLayerIdA, sdi_layer_id[i] equal to nuhLayerIdA and sdi_aux_id [i] in the range of 128 to 159, inclusive, for any value of i in range of 0 to sid_max_layers_minus1, inclusive.

Use of this SEI message requires the definition of the following variables:

A cropped picture width and picture height in units of luma samples, denoted herein by CroppedWidth and CroppedHeight, respectively.

A conformance cropping window left offset, ConfWinLeftOffset

A conformance cropping window top offset, ConfWinTopOffset

A chroma format indicator, denoted herein by ChromaFormatId

The variables SubWidthC and SubHeightC are derived from ChromaFormatIdc

When an access unit contains an auxiliary picture picA in a layer, with nuh_layer_id equal to nuhLayerIdA, that is indicated as an object mask auxiliary layer by an OMI SEI message, a primary picture picB in a layer, with nuh_layer_id equal to nuhLayerIdB, that is indicated as a primary layer by the OMI SEI message, OMI SEI message persists in output order until one or more of the following conditions are true:

A CLVS containing the auxiliary picture picA ends.
A CLVS containing the primary picture picB ends.
A CVS ends.
The bitstream ends.

The value of sdi_aux_id[sdi_associated_primary_layer_idx[i][j] shall be equal to 0.

omi_cancel_flag equal to 1 indicates that the SEI message cancels the persistence of any previous object mask information SEI message in output order that is associated with one or more primary picture layers to which this SEI applies.

omi_cancel_flag equal to 0 indicates that object mask information follows, and object mask information signaled in this SEI message would be used to update the present object mask information of any previous SEI message.

omi_mask_size_length_minus1 plus 1 specifies the length, in bits, of the omi_mask_top[i][j][k], and omi_mask_left[i][j][k] syntax elements. It is a requirement of bitstream conformance that the value of omi_mask_size_length_minus1 shall be the same for all object_mask_info( ) syntax structures within a CLVS.

omi_mask_pic_update_flag[i][j] equal to 1 indicates the mask information of $j^{th}$ object mask auxiliary picture associated with $i^{th}$ primary picture is signaled. omi_mask_pic_update_flag[i][j] equal to 0 indicates the mask information of $j^{th}$ object mask auxiliary picture associated with $i^{th}$ primary picture is not signaled. When the mask information of $j^{th}$ object mask auxiliary picture associated with $i^{th}$ primary picture is not present, the persistence mechanism is used, that is the information is inherited from the last OMI SEI message which signals the mask information of $j^{th}$ object mask auxiliary picture associated with $i^{th}$ primary picture.

omi_num_mask_in_pic_update[i][j] indicates the number of object masks in the $j^{th}$ auxiliary picture associated with $i^{th}$ primary picture to be signaled. omi_num_mask_in_pic_update [i][j] shall be in the range of 0 to (1<<BitDepthY)−1, inclusive, where BitDepthY is the bit depth for the samples of the luma component.

omi_mask_bounding_box_present_flag[i][j][k] equal to 1 indicates the bounding box parameters associated with the $k^{th}$ object mask in the $j^{th}$ object mask auxiliary picture associated with the $i^{th}$ primary picture, omi_mask_top[i][j][k], omi_mask_left[i][j][k], omi_mask_width[i][j][k], and omi_mask_height[i][j][k], are present. omi_num_mask_in_pic_update[i][j][k] equal to 0 indicates the bounding box parameters associated with the $k^{th}$ object mask in the $j^{th}$ object mask auxiliary picture associated with the $i^{th}$ primary picture, omi_mask_top[i][j][k], omi_mask_left[i][j][k], omi_mask_width[i][j][k], and omi_mask_height[i][j][k], are not present.

omi_mask_id[i][j][k] indicates the identifier of $k^{th}$ object mask in the $j^{th}$ object mask auxiliary picture associated with $i^{th}$ primary picture.

The variable maskId[i][j][k] specifying the object mask identifier of $k^{th}$ object mask of the $j^{th}$ object mask auxiliary picture associated with $i^{th}$ primary picture in the SEI message is derived as follows:

```
for( i = 0; i <= omi_num_primary_pic_layer_minus1; i++ ) {
  for( j = 0; j <= numAuxLayer[omi_primary_pic_layer_id[ i ]]; j++ ) {
    for( k = 0; k <= omi_num_mask_in_pic[ i ]; k++ ) {
      maskId[ i ][ j ][ k ] = omi_mask_id[ i ][ j ][ k ] +
(1 << BitDepthY)*j
    }
  }
}
```

For example, information about the bounding box can be generated and signaled in the SEI message. Indicators omi_mask_top[i][j][k], omi_mask_left[i][j][k], omi_mask_width[i][j][k], and omi_mask_height[i][j][k], specify the coordinates of the top-left corner and the width and height, respectively, of the bounding box of the object identified by the identifier omi_mask_id[i][j][k] in the cropped decoded picture, related to the conformance cropping window specified by active SPS.

The value of omi_mask_left[i][j][k] shall be in the range of 0 to (CroppedWidth/SubWidthC−1), inclusive, CroppedWidth and SubWidthC being associated to the $j^{th}$ object mask auxiliary picture associated with $i^{th}$ primary picture. When omi_mask_left[i][j][k] is not present, the value of omi_mask_left[i][j][k] is inferred to be 0.

The value of omi_mask_top[i][j][k] shall be in the range of 0 to (CroppedHeight/SubHeightC−1), inclusive, CroppedHeight and SubHeightC being associated to the $j^{th}$ object mask auxiliary picture associated with $i^{th}$ primary picture. When omi_mask_top[i][j][k] is not present, the value of omi_mask_top[i][j][k] is inferred to be 0.

The value of omi_mask_width[i][j][k] shall be in the range of 0 to (CroppedWidth/SubWidthC−omi_mask_left[i][j][k]), inclusive. When omi_mask_width[i][j][k] is not present, the value of omi_mask_width[i][j][k] is inferred to be (CroppedWidth/SubWidthC−omi_mask_left[i][j][k]).

The value of omi_mask_height[i][j][k] shall be in the range of 0 to (CroppedHeight/SubHeightC−omi_mask_top[i][j][k]), inclusive. When omi_mask_height[i][j][k] is not present, the value of omi_mask_height[i][j][k] is inferred to be (CroppedHeight/SubHeightC−omi_mask_top[i][j][k])

The identified object mask is within a bounding box containing the luma samples with horizontal picture coordinates from SubWidthC*(ConfWinLeftOffset+omi_mask_left[i][j][k]) to SubWidthC*(ConfWinLeftOffset+omi_mask_left[i][j][k]+omi_mask_width[i][j][k])−1, inclusive, and vertical picture coordinates from SubHeightC*(ConfWinTopOffset+omi_mask_top[i][j][k]) to SubHeightC*(ConfWinTopOffset+omi_mask_top[i][j][k]+omi_mask_height[i][j][k])−1, inclusive.

Variable p[i][j][x][y] is the decoded value of the sample at the relative sample location (x, y) in the $j^{th}$ object mask auxiliary picture associated with the $i^{th}$ primary picture.

```
for( i = 0; i <= omi_num_primary_pic_layer_minus1; i++ ) {
  for( j = 0; j <= numAuxLayer[omi_primary_pic_layer_id[ i ]]; j++ ) {
    for( k = 0; k <= omi_num_mask_in_pic[ i ]; k++ ) {
&& x >= omi_mask_left[ i ][ j ] [ k ] && x < omi_mask_left[ i ][ j ][ k ] +
omi_mask_width[ i ][ j ][ k ]
&& y >= omi_mask_top[ i ][ j ][ k ] && y < omi_mask_top[ i ][ j ][ k ] +
omi_mask_height[ i ][ j ][ k ] )
sample (x, y) is associated with mask with the identifier of maskId[ i ][ j ][ k ]
    }
  }
``` omi_mask_cancel[i][j][k] equal to 1 cancels the persistence scope of object mask with identifier equal to omi_mask_id[i][j][k]. omi_mask_cancel[i][j][k] equal to 0 indicates the information of object mask with identifier equal to omi_mask_id[i][j][k] is signaled.

The variable maskIdExist[i][j][k] equal to 1 indicates the object mask with identifier k in the $j^{th}$ object mask auxiliary picture associated with it primary picture exists. The variable maskIdExist[i][j][k] equal to 0 indicates the object mask with identifier equal to k in the $j^{th}$ object mask auxiliary picture associate with $i^{th}$ primary picture does not exist. maskIdExist[i][j][k] is initialized with 0 before decoding the current CVS.

omi_mask_confidence[i][j][k] indicates the degree of confidence associated with the kl object mask in the $j^{th}$ object mask auxiliary picture associated with $i^{th}$ primary picture, in units of $2^{-(omi\_mask\_confidence\_length\_minus1+1)}$, such that a higher value of omi_mask_confidence[i][j][k] indicates a higher degree of confidence. The length of the omi_mask_confidence[i][j][k] syntax element is omi_mask_confidence_length_minus1+1 bits.

omi_mask_depth[i][j][k] indicates the object depth associated with the $k^{th}$ object mask in the $j^{th}$ object mask auxiliary picture associated with $i^{th}$ primary picture. A smaller value of omi_mask_depth indicates a shorter distance to the object. The length of the omi_mask_depth[i][j][k] syntax element is omi_object_depth_length_minus1+1 bits.

omi_mask_label[i][j][k] specifies the contents of the label associated with $k^{th}$ object mask in the $j^{th}$ object mask auxiliary picture associated with $i^{th}$ primary picture. The length of the omi_mask_label[i][j][k] syntax element shall be less than or equal to 255 bytes, not including the null termination byte.

In some other embodiments, the bounding box parameters omi_mask_top[i][j][k], omi_mask_left[i][j][k], omi_mask_width[i][j][k], and omi_mask_height[i][j][k] are coded with fix length code and the length is pre-set such as 8, 16 or 32. In that case, there is no need to signal omi_mask_size_length_minus1. As shown below in Table 12, 16-bit code is used to code omi_mask_top[i][j][k], omi_mask_left[i][j][k], omi_mask_width[i][j][k], and omi_mask_height[i][j][k]. The definitions of common features denoted as "high level info" and the individual features denoted as "individual mask information", some of which are omitted, can be inherited from the embodiments described above with shared parameter/function names.

TABLE 12

Syntax of OMI SEI message

|  | Descriptor |
|---|---|
| object_mask_info( payloadSize ) { |  |
|   omi_cancel_flag | u(1) |
|   ... |  |
|   omi_mask_bounding_box_present_flag[ i ][ j ][ k ] | u(1) |
|   if (omi_mask_bounding_box_present_flag[ i ][ j ][ k ]) { |  |
|     omi_mask_top[ i ][ j ][ k ] | u(16) |
|     omi_mask_left[ i ][ j ][ k ] | u(16) |
|     omi_mask_width[ i ][ j ][ k ] | u(16) |
|     omi_mask_height[ i ][ j ][ k ] | u(16) |
|   } |  |
|   ... |  |
| } |  |

In some of the above embodiments, the value of the sample at location (x, y), denoted as p[x][y], indicates the mask identifier associated with the sample. For the sample with bit-depth equal bitdepthY, the maximum number of masks identifiers is 1<<bitdepthY. However, when two object masks overlap with each other, the sample value cannot represent it as there are more than one mask associated with a sample. Thus, in some of the above embodiments, multiple object mask auxiliary pictures are used. p[i][x][y] denotes the sample value at location (x, y) of it mask auxiliary picture. If there are two object masks with identifier idA and idB associated with sample location (x, y), p[0][x][y] can be set to idA and p[1][x][y] can be set to idB. Thus, the maximum overlapped masks which can be supported is equal to the maximum number of object mask auxiliary picture.

In some embodiments, the mask identifier is not directly represented by the value of sample, but can be represented by a bit of the sample value. That is to say, each bit of the sample value represents a distinct identifier of the mask. If a mask with identifier idA is associated with sample at location (x, y), then sample value at location (x y), p[x][y], is equal to (1<<idA). Suppose the sample bit-depth is bitdepthY, the maximum number of mask identifiers is bitdepthY. With this method, the maximum number of mask identifiers supported for an object mask auxiliary picture is less than that in previous embodiments. However, mask overlapping case can be easily handled. For example, if there are two object masks with identifier idA and idB (idA is not equal to idB as there are two different masks) associated with sample location (x, y), p[x][y] can be set to $(1<<idA)+(1<<idB)$. And for a sample value at location (x, y), if the $k^{th}$ bit is "1", the sample (x, y) is covered by kl mask; if the $k^{th}$ bit is "0", the sample (x, y) is not covered by kl mask. FIG. 9 shows an exemplary binary presentation of sample value p[x][y], according to some embodiments of the present disclosure. As shown in FIG. 9, it is a binary representation of a sample value p[x][y]. The least significant bit is "0", so it means the sample (x, y) is not covered by the $0^{th}$ mask (or the mask with identifier being 0); the $1^{st}$ bit position is also "0" which means the sample (x, y) is not covered by the $1^{st}$ mask (or the mask with identifier being 1); the $2^{nd}$ bit position and the most significant bit are both "1", so it means the sample (x, y) is covered both by the $2^{nd}$ mask and the $(bitdepthY-1)^{th}$ mask (i.e., two masks with identifier 2 and bitdepthY-1 overlapped at sample location (x,y)).

To support more mask identifiers, multiple object mask auxiliary pictures can be used. For example, there are m object mask auxiliary pictures with index being 0 to m-1 and bit-depth equal to bitdepthY, the object mask identifier associated with sample location (x, y) is idA. The sample value of each mask auxiliary picture at location (x, y) can be derived as

```
n=0;
while(idA > bitdepthY)
{
   idA =idA – bitdepthY;
   n++;
}
p[i][x][y]= 1<<idA (when i is equal to n)
p[i][x][y] = 0 (when i is not equal to n)
where p[i][x][y] is the value of the sample at location (x, y) in the i^th mask
auxiliarypicture.
```

In some of the above embodiments, the identifiers of the object masks are represented by the values of the samples within the mask areas in the auxiliary pictures. Thus, the encoder cannot change the mask area sample values to optimize the coding results, and cannot adjust the samples values for the mask areas in real time. In some embodiments, the auxiliary pictures may include a plurality of predetermined sample values, and the sample value used to represent the mask of the object can be selected from the plurality of predetermined sample values according to value differences therebetween. For example, if there are three object masks in a first frame, the encoder may set the mask sample values for these three object masks to be 64, 128, and 192, respectively (i.e., these three object masks have identifiers equal to 64, 128, and 192, respectively), as longer sample value distance gives more sample recovery space and thus it has more error-resilience. In a second frame, the two objects with identifiers equal to 128 and 192 respectively go out of the picture, and only the mask with identifier equal to 64 is left in the picture. Although changing the sample value for this mask from 64 to 128 can give more error-resilience, the encoder cannot change the sample value as the sample value is the identifier of this mask.

To solve the above problem, in some embodiments, the determination of the mask sample values is separated from the mask identifier, so that the mask sample value of a mask can changed from the frame to the frame. This enables the encoder to optimize the coding results by adjusting the samples value according to the mask numbers in different frames.

The syntax are shown below in Table 13 and semantics are given below the table. The syntax element omi_aux_sample_value[i][j][k] is the mask sample value for the object mask with identifier omi_mask_id[i][j][k] and it is only signaled when the syntax element omi_mask_id_equal_to_aux_sample_value_flag is equal to false which means the mask sample values are different from the mask identifiers. In the case that mask sample values are different from the mask identifiers, the bit length of the mask sample values, and the mask identifiers may be different. Thus, two syntax elements omi_mask_id_length and omi_aux_sample_value_length_minus8 are signaled to indicate the bit length of mask sample values and the mask identifiers, respectively. The syntaxes and semantics of these syntax elements are italicized below. The definitions of common features denoted as "high level info" and the individual features denoted as "individual mask information", some of which are omitted, can be inherited from the embodiments described above with shared parameter/function names.

TABLE 13

Syntax of OMI SEI message

| | Descriptor |
|---|---|
| object_mask_info( payloadSize ) { | |
|   omi_cancel_flag | u(1) |
|   if( !omi_cancel_flag ) { | |
|     omi_aux_id_minus128 | ue(v) |
|     omi_num_primary_pic_layer_minus1 | ue(v) |
|     for( i = 0; i <= omi_num_primary_pic_layer_minus1; i++ ) | |
|       omi_primary_pic_layer_id[ i ] | ue(v) |
|     omi_mask_id_equal_to_aux_sample_value_flag | u(1) |
|     if( !omi_mask_id_equal_aux_sample_value_flag ) { | |
|       omi_mask_id_length | ue(v) |
|       omi_aux_sample_value_length_minus8 | ue(v) |
|     } else | |
|       omi_mask_id_length_minus8 | ue(v) |
|     omi_mask_confidence_info_present_flag | u(1) |
|     if( omi_mask_confidence_info_present_flag ) | |
|       omi_mask_confidence_length_minus1 | u(4) |
|     omi_mask_depth_info_present_flag | u(1) |
|     if( omi_mask_depth_info_present_flag ) | |

TABLE 13-continued

Syntax of OMI SEI message

| | Descriptor |
|---|---|
| omi_mask_depth_length_minus1 | u(4) |
| omi_mask_label_info_present_flag | u(1) |
| if( omi_mask_label_info_present_flag ) { | |
|   omi_mask_label_language_present_flag | u(1) |
|   if( omi_mask_label_language_present_flag ) { | |
|     while( !byte_aligned( ) ) | |
|       omi_bit_equal_to_zero | f(1) |
|     omi_mask_label_language | st(v) |
|   } | |
| } | |
| for( i = 0; i <= omi_num_primary_pic_layer_minus1; i++ ) | |
|   for( j = 0; j < numAuxLayer[ omi_primary_pic_layer_id[ i ] ]; j++ ) { | |
|     omi_mask_pic_update_flag[ i ][ j ] | f(1) |
|     if( omi_mask_pic_update_flag[ i ][ j ] ) { | |
|       omi_num_mask_in_pic_update[ i ][ j ] | ue(v) |
|       for( k = 0; k < omi_num_mask_in_pic_update[ i ][ j ]; k++ ) { | |
|         omi_mask_id[ i ][ j ][ k ] | u(v) |
|         if( !omi_mask_id_equal_aux_sample_value_flag ) | u(v) |
|           omi_aux_sample_value[ i ][ j ][ k ] | u(v) |
|         omi_mask_bounding_box_present_flag[ i ][ j ][ k ] | u(1) |
|         if( omi_mask_bounding_box_present_flag[ i ][ j ][ k ] ) { | |
|           omi_mask_top[ i ][ j ][ k ] | u(16) |
|           omi_mask_left[ i ][ j ][ k ] | u(16) |
|           omi_mask_width[ i ][ j ][ k ] | u(16) |
|           omi_mask_height[ i ][ j ][ k ] | u(16) |
|         } | |
|         omi_mask_cancel[ i ][ j ][ k ] | u(1) |
|         if( !omi_mask_cancel[ i ][ j ][ k ] ) { | |
|           if( omi_mask_confidence_info_present_flag ) | |
|             omi_mask_confidence[ i ][ j ][ k ] | u(v) |
|           if( omi_mask_depth_info_present_flag ) | |
|             omi_mask_depth[ i ][ j ][ k ] | u(v) |
|           while( !byte_aligned( ) ) | |
|             omi_bit_equal_to_zero | f(1) |
|           if( omi_mask_label_info_present_flag ) | |
|             omi_mask_label[ i ][ j ][ k ] | st(v) |
|         } | |
|       } | |
|     } | |
|   } | |
| } | |

The object mask information (OMI) SEI message provides information about object mask pictures coded as auxiliary pictures. Object mask auxiliary pictures have nuh_layer_id equal to sdi_layer_id[i] and sdi_aux_id [i] in the range of 128 to 159, inclusive, for any value of i in range of 0 to sid_max_layers_minus1, inclusive.

NOTE 1—Each object mask auxiliary picture layer is associated with one primary picture layer and one primary picture layer may be associated with one or more object mask auxiliary picture layers.

Use of this SEI message requires the definition of the following variables:

A cropped picture width and picture height in units of luma samples, denoted herein by CroppedWidth and CroppedHeight, respectively.

A conformance cropping window left offset, ConfWinLeftOffset

A conformance cropping window top offset, ConfWinTopOffset

A chroma format indicator, denoted herein by ChromaFormatIdc.

The variables SubWidthC and SubHeightC are derived from ChromaFormatIdc.

When an access unit contains an auxiliary picture picA in a layer, with nuh_layer_id equal to nuhLayerIdA, that is indicated as an object mask auxiliary layer by an OMI SEI message, and a primary picture picB in a layer, with nuh_layer_id equal to nuhLayerIdB, that is indicated as a primary layer by the OMI SEI message, OMI SEI message persists in output order until one or more of the following conditions are true:

A CLVS containing the auxiliary picture picA ends.
A CLVS containing the primary picture picB ends.
A CVS ends.
The bitstream ends.

omi_cancel_flag equal to 1 indicates that the SEI message cancels the persistence of any previous object mask information SEI message in output order that is associated with one or more primary picture layers to which this SEI applies. omi_cancel_flag equal to 0 indicates that object mask information follows, and object mask information signaled in this SEI message would be used to update the present object mask information of any previous SEI message.

omi_aux_id_minus128 plus 128 indicates the value of sdi_aux_id of object mask auxiliary picture layer. om_aux_id_minus128 shall be in the range of 0 to 31, inclusive.

When a CVS does not contain an SDI SEI message with sdi_aux_id[i] equal to omi_aux_id_minus128+128 for at least one value of i, no picture in the CVS shall be associated with an OMI SEI message.

When an AU contains both an SDI SEI message with sdi_aux_id[i] equal to omi_aux_id_minus128+128 for at least one value of i and an OMI SEI message, the SDI SEI message shall precede the OMI SEI message in decoding order.

omi_num_primary_pic_layer_minus1 plus 1 indicates the number of primary picture layers associated with the object mask auxiliary picture layers to which this SEI message applies. The value of omi_num_primary_pic_layer_minus1 shall be in the range of 0 to sdi_max_layers_minus1.

omi_primary_pic_layer_id[i] specifies the nuh_layer_id value of the $i^{th}$ primary picture layer to which this OMI SEI message applies. The value of sdi_aux_id[j] shall be equal to 0 for any value of j in the range of 0 to sid_max_layers_minus1, inclusive, if sdi_layer_id[j] equal to omi_primary_pic_layer_id[i].

omi_mask_id_equal_to_aux_sample_value_flag equal to 1 indicates the identifier of the object mask is equal to value of the samples within the mask. omi_mask_id_equal_to_aux_sample_value_flag equal to 0 indicates the identifier of the object mask may be different from the value of the samples within the mask.

omi_mask_id_length specifies the length, in bits, of omi_mask_id[i][j][k] syntax elements when it is present.

omi_aux_sample_value_length_minus8 plus 8 specifies the length, in bits, of omi_aux_sample_value[i][j][k] syntax elements. It is a requirement of bitstream conformance that the value of omi_aux_sample_value_length_minus8 plus 8 shall be equal to $BitDepth_Y$.

omi_mask_id_length_minus8 plus 8 specifies the length, in bits, of omi_mask_id[i][j][k] syntax elements.

omi_mask_confidence_info_present_flag equal to 1 indicates that omi_mask_confidence[i][j][k] syntax elements are present. omi_mask_confidence_info_present_flag equal to 0 indicates that omi_mask_confidence[i][j][k] syntax elements are not present. It is a requirement of bitstream conformance that the value of omi_mask_confidence_info_present_flag shall be the same for all object_mask_info( ) syntax structures within a CLVS.

omi_mask_confidence_length_minus1 plus 1 specifies the length, in bits, of the omi_mask_confidence[i][j][k] syntax elements. It is a requirement of bitstream conformance that the value of omi_mask_confidence_length_minus1 shall be the same for all object_mask_info( ) syntax structures within a CLVS.

omi_object_depth_info_present_flag equal to 1 indicates that omi_object_depth[i][j][k] syntax elements are present. omi_object_depth_info_present_flag equal to 0 indicates that omi_object_depth[i][j][k] syntax elements are not present. It is a requirement of bitstream conformance that the value of omi_object_depth_info_present_flag shall be the same for all object_mask_info( ) syntax structures within a CLVS.

omi_object_depth_length_minus1 plus 1 specifies the length, in bits, of the omi_object_depth[i][j][k] syntax elements. It is a requirement of bitstream conformance that the value of omi_object_depth_length_minus1 shall be the same for all object_mask_info( ) syntax structures within a CLVS.

omi_mask_label_info_present_flag equal to 1 indicates that omi_mask_label_language_present_flag and omi_mask_label[i][j][k] syntax elements are present. omi_mask_label_info_present_flag equal to 0 indicates that omi_mask_label_language_present_flag and omi_mask_label[i][j][k] syntax elements are not present.

omi_mask_label_language_present_flag equal to 1 indicates that omi_mask_label_language syntax element is present. omi_mask_label_language_present_flag equal to 0 indicates that omi_mask_label_language syntax element is not present.

omi_bit_equal_to_zero shall be equal to 0.

omi_mask_label_language contains a language tag as specified by IETF RFC 5646 followed by a null termination byte equal to 0x00. The length of the omi_mask_label_language syntax element shall be less than or equal to 255 bytes, not including the null termination byte. When not present, the language of the label is unspecified.

omi_mask_pic_update_flag[i][j] equal to 1 indicates the mask information of $j^{th}$ object mask auxiliary picture associated with it primary picture is signaled. omi_mask_pic_update_flag[i][j] equal to 0 indicates the mask information of $j^{th}$ object mask auxiliary picture associated with $i^{th}$ primary picture is not signaled. When the mask information of $j^{th}$ object mask auxiliary picture associated with it primary picture is not present, the persistence mechanism is used, that is the information is inherited from the last OMI SEI message which signals the mask information of $j^{th}$ object mask auxiliary picture associated with $i^{th}$ primary picture.

omi_num_mask_in_pic_update[i][j] indicates the number of object masks of which the information to be signaled in the $j^{th}$ auxiliary picture associated with it primary picture. omi_num_mask_in_pic_update [i][j] shall be in the range of 0 to (1<<BitDepthY)−1, inclusive, where BitDepthY is the bit depth for the samples of the luma component. The variable omiNumMaskInPic[i][j] indicating the number of object masks in the $j^{th}$ auxiliary picture associated with it primary picture is set to omi_num_mask_in_pic_update[i][j] when the current SEI message is the first OMI SEI message in the current CLVS.

The variable numAuxLayer[primaryLayerId] indicates the number of the auxiliary picture layers associated with primary picture layer with nuh_layer_id equal to primaryLayerId. The variable associatedAuxLayerId[primaryLayerId][i] indicates the value of nuh_layer_id of the $i^{th}$ auxiliary picture layer associated with primary picture layer with nuh_layer_id equal to primaryLayerId. numAuxLayer[primaryLayerId] and associatedAuxLayerId[primaryLayerId][i] are derived as follows:

```
for( i = 0; i <= sdi_max_max_layers_minus1; i++ )
  numAuxLayer[ sdi_layer_id[ i ] ] = 0;
for( i = 0; i <= sdi_max_layers_minus1; i++ ){
  if( sdi_aux_id[ i ] == omi_aux_id_minus128 + 128 ){
    for( j = 0; j <= sdi_num_associated_primary_layers_minus1[ i ]; j++ ) {
      primaryLayerId = sdi_layer_id[ sdi_associated_primary_layer_idx[ i ][ j ] ];
      associatedAuxLayerId[ primaryLayerId ][ numAuxLayer[ primaryLayerId ] ] =
sdi_layer_id[ i ];
      numAuxLayer[ primaryLayerId ]++;
    }
  }
}
``` omi_mask_id [i][j][k] indicates the identifier of $k^{th}$ object mask in the $j^{th}$ object mask auxiliary picture associated with the $i^{th}$ primary picture.

omi_aux_sample_value [i][j][k] indicates the value of the samples within the object mask with identifier equal to omi_mask_id [i][j][k].

The variable maskId [i][j][k] specifying the object mask identifier of $k^{th}$ object mask in the $j^{th}$ object mask auxiliary picture associated with $i^{th}$ primary picture in the SEI message is derived as follows:

```
for( i = 0; i <= omi_num_primary_pic_layer_minus1; i++ ) {
  for( j = 0; j < numAuxLayer[omi_primary_pic_layer_id[ i ]]; j++ ) {
    for( k = 0; k < omiNumMaskInPic[ i ][ j ]; k++ ) {
      maskId[ i ][ j ][ k ] = omi_mask_id[ i ][ j ][ k ] + (1<<BitDepthY)*j
    }
  }
}
``` omi_mask_bounding_box_present_flag [i][j][k] equal to 1 indicates the syntax elements omi_mask_top[i][j][k], omi_mask_left[i][j][k], omi_mask_width[i][j][k], and omi_mask_height[i][j][k], are present. omi_num_mask_in_pic_update[i][j][k] equal to 0 indicates syntax elements, omi_mask_top[i][j][k], omi_mask_left[i][j][k], omi_mask_width[i][j][k], and omi_mask_height[i][j][k], are not present.

omi_mask_top[i][j][k], omi_mask_left[i][j][k], omi_mask_width[i][j][k], and omi_mask_height[i][j][k] indicate the coordinates of the top-left corner and the width and height, respectively, of the bounding box of the object mask with identifier equal to omi_mask_id[i][j][k] in the cropped decoded picture, relative to the conformance cropping window specified by the active SPS.

The value of omi_mask_left[i][j][k] shall be in the range of 0 to (CroppedWidth/SubWidthC−1), inclusive, CroppedWidth and SubWidthC being associated to the $j^{th}$ object mask auxiliary picture associated with $i^{th}$ primary picture. When it is not present, the value of omi_mask_left[i][j][k] is inferred to be 0.

The value of omi_mask_top[i][j][k] shall be in the range of 0 to (CroppedHeight/SubHeightC−1), inclusive, CroppedHeight and SubHeightC being associated to the $j^{th}$ object mask auxiliary picture associated with $i^{th}$ primary picture. When it is not present, the value of omi_mask_top [i][j][k] is inferred to be 0.

The value of omi_mask_width[i][j][k] shall be in the range of 0 to (CroppedWidth/SubWidthC−omi_mask_left[i][j][k]), inclusive. When it is not present, the value of omi_mask_width [i][j][k] is inferred to be (CroppedWidth/SubWidthC−omi_mask_left[i][j][k]).

The value of omi_mask_height[i][j][k] shall be in the range of 0 to (CroppedHeight/SubHeightC−omi_mask_top [i][j][k]), inclusive. When it is not present, the value of omi_mask_height [i][j][k] is inferred to be (CroppedHeight/SubWidthC−omi_mask_top[i][j][k]).

The identified object mask is within a bounding box containing luma samples with horizontal coordinates from SubWidthC*(ConfWinLeftOffset+omi_mask_left[i][j][k]) to SubWidthC*(ConfWinLeftOffset+omi_mask_left[i][j][k]+omi_mask_width[i][j][k])−1, inclusive, and vertical coordinates from SubHeightC*(ConfWinTopOffset+omi_mask_top[i][j][k]) to SubHeightC*(ConfWinTopOffset+omi_mask_top[i][j][k]+omi_mask_height[i][j][k])−1, inclusive.

Variable I[i][j][x][y] is the decoded value of the sample at the relative sample location (x, y) in the $j^{th}$ object mask auxiliary picture associated with the $i^{th}$ primary picture. The following process is to determine each mask region in each auxiliary picture.

```
if( !omi_mask_id_equal_aux_sample_value_flag )
  maskSampleValue[ i ][ j ][ k ] = omi_aux_sample_value[ i ][ j ][ k ]
else
  maskSampleValue[ i ][ j ][ k ] = omi_mask_id [ i ][ j ][ k ]
for( i = 0; i <= omi_num_primary_pic_layer_minus1; i++ ) {
  for( j = 0; j < numAuxLayer[omi_primary_pic_layer_id[ i ]]; j++ ) {
    for( k = 0; k < omiNumMaskInPic[ i ][ j ]; k++ ) {
      if( pI[ i ][ j ][ x ][ y ] == maskSampleValue [ i ][ j ][ k ]
        && x >= omi_mask_left[ i ][ j ][ k ]
        && x < omi_mask_left[ i ][ j ][ k ] + omi_mask_width[ i ][ j ][ k ]
        && y >= omi_mask_top[ i ][ j ][ k ]
        && y < omi_mask_top[ i ][ j ][ k ] + omi_mask_height[ i ][ j ][ k ] )
        The sample at location (x, y) in the j^th object mask auxiliary picture
        associated with the i^th primary picture is associated with the object
        mask with the identifier of maskId[ i ][ j ][ k ]
    }
  }
}
``` omi_mask_cancel[i][j][k] equal to 1 cancels the persistence scope of object mask with identifier equal to om_mask_id[i][j][k]. omi_mask_cancel[i][j][k] equal to 0 indicates the information of object mask with identifier equal to omi_mask_id[i][j] is signaled.

It is a requirement of bitstream conformance that when omi_mask_id[i][j][k] with a particular value is parsed for the first time in the current CLVS, the value of the corresponding omi_mask_cancel[i][j][k] shall be equal to 0.

omi_mask_confidence[i][j][k] indicates the degree of confidence associated with the kl object mask in the $j^{th}$ object mask auxiliary picture associated with it primary picture, in units of $2^{-(omi\_mask\_confidence\_length\_minus1+1)}$, such that a higher value of omi_mask_confidence[i][j][k] indicates a higher degree of confidence. The length of the omi_mask_confidence[i][j][k] syntax element is omi_mask_confidence_length_minus1+1 bits.

omi_mask_depth[i][j][k] indicates the object depth associated with the $k^{th}$ object mask in the $j^{th}$ object mask auxiliary picture associated with $i^{th}$ primary picture. A smaller value of omi_mask_depth indicates a shorter distance to the object. The length of the omi_mask_depth[i][j][k] syntax element is omi_object_depth_length_minus1+1 bits.

omi_mask_label[i][j][k] specifies the contents of the label associated with $k^{th}$ object mask in the $j^{th}$ object mask auxiliary picture associated with $i^{th}$ primary picture. The length of the omi_mask_label[i][j][k] syntax element shall be less than or equal to 255 bytes, not including the null termination byte.

Figure 10:
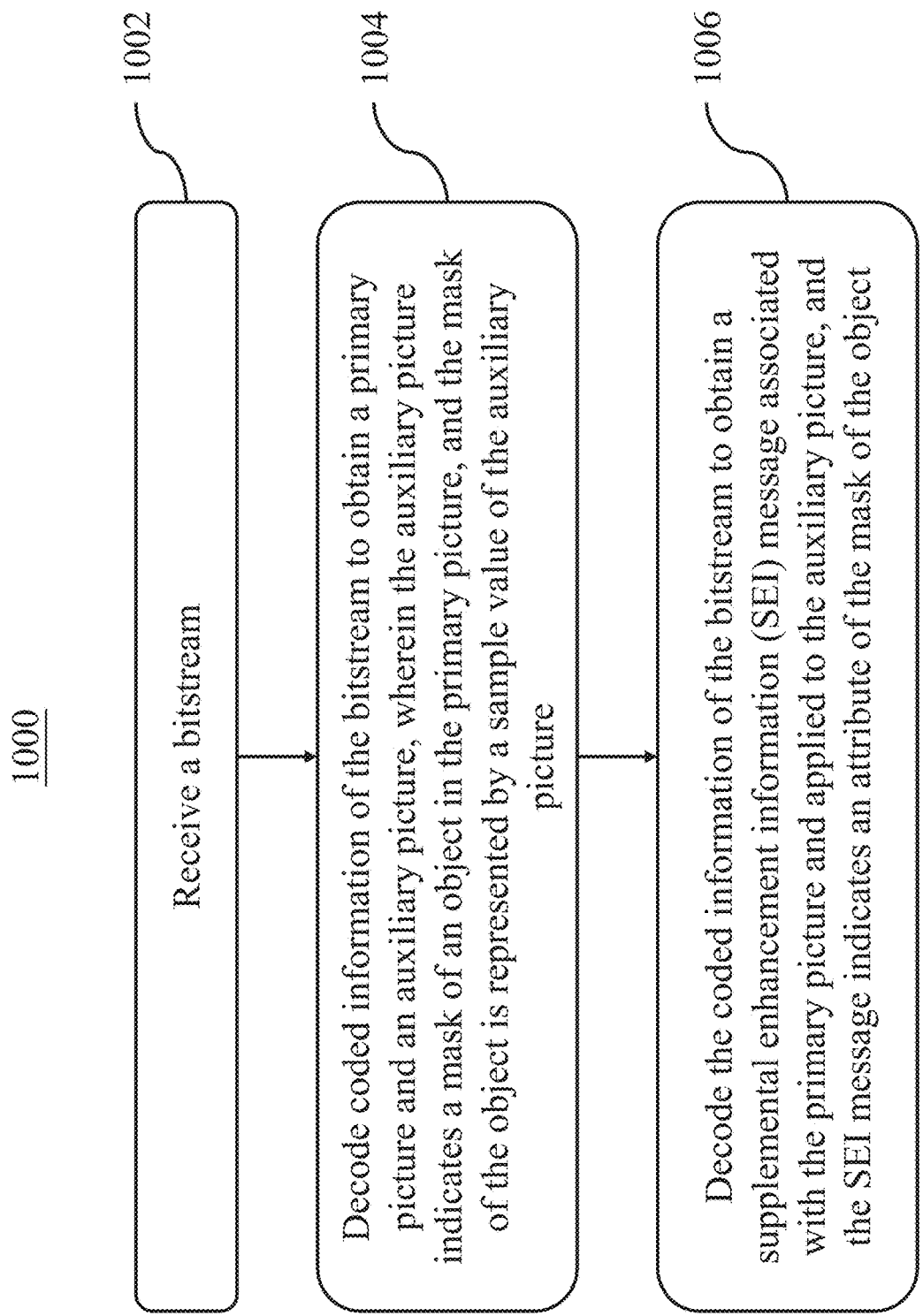
FIG. 10 is a schematic diagram illustrating an exemplary method for detecting an object, consistent with embodiments of the disclosure.

In some embodiments, a method for detecting an object is also provided. FIG. 10 is a schematic diagram illustrating an exemplary method 1000 for detecting an object, consistent with embodiments of the disclosure. As shown in FIG. 10, method 1000 may include steps 1002 to 1006, which can be implemented by a decoder (e.g., image/video decoder 144 in FIG. 1, or apparatus 400 in FIG. 4).

In step 1002, the decoder can receive a bitstream. The bitstream can be encoded according to any of the encoding methods described above.

In step 1004, the decoder can decode the coded information of the bitstream to obtain a primary picture and an auxiliary picture. The auxiliary picture can be used to indicate a mask of an object in the primary picture. The mask of the object can be represented by a sample value of the auxiliary picture.

In step 1006, the decoder can decode the coded information of the bitstream to obtain a supplemental enhancement information (SEI) message associated with the primary picture and applied to the auxiliary picture. As described above, the SEI message can be used to indicate attribute(s) of the mask of the object.

In some embodiments, a non-transitory computer-readable storage medium storing a bitstream is also provided. The bitstream can be encoded and decoded according to the above-described methods. FIG. 11 is a schematic diagram illustrating contents of an exemplary bitstream 1100. As shown in FIG. 11, bitstream 1100 can be used to convey a primary picture 1101, an auxiliary picture 1102, and a supplemental enhancement information (SEI) message 1103 (e.g., FIG. 5). Auxiliary picture 1102 indicates a mask of the object in primary picture 1101, wherein the mask of the object can be represented by a sample value of auxiliary picture 1102. SEI message 1103 is associated with primary picture 1101 and can be applied to auxiliary picture 1102. SEI message 1103 can be used to indicate the attribute(s) of the mask of the object, as described above.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method for encoding a video sequence into a bitstream, the method comprising:
    receiving a video sequence; and
    encoding one or more pictures of the video sequence to generate a bitstream, comprising:
        encoding an auxiliary picture indicating a mask of an object in a primary picture, the mask of the object being represented by a sample value of the auxiliary picture; and
        generating a supplemental enhancement information (SEI) message indicating an attribute of the mask of the object.

2. The method according to clause 1, wherein generating the SEI message comprises:
    determining a cancel flag indicating whether the SEI message cancels a persistence of a previous SEI message.

3. The method according to clause 2, wherein the attribute of the mask comprises individual features of the mask of the object and common features of a plurality of masks indicated by the SEI message, and
    wherein generating the SEI message further comprises:
        determining the common features and the individual features, in response to the determination that the cancel flag indicates that the SEI message does not cancel the persistence of information of the previous SEI message.

4. The method according to clause 1, wherein the attribute of the mask comprises individual features of the mask of the object and common features of a plurality of masks indicated by the SEI message, and the common features include at least one of the following:
    an identifier of the auxiliary picture to which the SEI message applies;
    a number of bits used for coding identifier of any of the plurality of masks;
    a bit-depth of sample value of the auxiliary picture;
    a confidence present flag indicating whether confidence information of the plurality of masks is comprised in the SEI message;
    a length of the confidence information of the plurality of masks, in response to the confidence present flag indicates that the confidence information of the plurality of masks is comprised in the SEI message;
    a depth present flag indicating whether depth information of the plurality of masks is comprised in the SEI message;
    a length of the depth information of the plurality of masks, in response to the depth present flag indicates that the depth information of the plurality of masks is comprised in the SEI message;
    a label present flag indicating whether label information of the plurality of masks are comprised in the SEI message;
    a language present flag indicating whether label language information of the plurality of masks is comprised in the SEI message, in response to label present flag indicates that the label information of the plurality of masks are comprised in the SEI message; or a label language information of the plurality of masks, in response to the language present flag indicates that the label language information of the plurality of masks is comprised in the SEI message.

5. The method according to clause 4, wherein the SEI message applies to a plurality of auxiliary pictures, and the common features further comprise a number of the plurality of auxiliary pictures.

6. The method according to clause 5, wherein the SEI message comprises the individual features generated for masks represented by the plurality of auxiliary pictures.

7. The method according to any of clauses 4 to 6, wherein the SEI message is associated with a plurality of primary pictures corresponding to the auxiliary pictures to which the SEI message applies.

8. The method according to clause 7, wherein the common features further comprise a number of the plurality of primary pictures and the layer identifiers of the plurality of primary pictures.

9. The method according to clause 8, wherein generating the SEI message comprises:
  determining a second number of the auxiliary pictures corresponding to each of the plurality of primary pictures; and
  determining the individual features for the masks represented by the second number of the auxiliary pictures for each of the plurality of primary pictures.

10. The method according to any of clauses 1 to 9, wherein generating the SEI message further comprises:
  determining whether the mask of the object is different from a previous mask of the object represented by a previous auxiliary picture; and
  encoding the attribute of the mask of the object in the SEI message, in response to the determination that the mask of the object is different from the previous mask of the object.

11. The method according to clause 10, further comprising:
  skip encoding, in response to the determination that the mask of the object is the same as the previous mask of the object, the attribute of the mask of the object in the SEI message.

12. The method according to any of clauses 1 to 11, wherein generating the SEI message further comprises:
  determining a mask cancel flag indicating whether the mask of the object cancels a persistence of a previous mask of the object.

13. The method according to any of clauses 1 to 12, wherein generating the SEI message comprises:
  determining a bounding box compassing the mask of the object; and
  encoding the bounding box in the SEI message.

14. The method according to any of clauses 1 to 13, wherein the sample value of the auxiliary picture is encoded in a lossy manner.

15. The method according to any of clauses 1 to 13, wherein the mask of the object is indicated by a bit of the sample value of the auxiliary picture.

16. The method according to any of clauses 1 to 13, wherein the mask of the object is indicated by a sample value of the auxiliary picture.

17. The method according to clause 16, wherein the sample value is comprised in the SEI message.

18. The method according to any of clauses 1 to 13, wherein the auxiliary pictures comprises a plurality of predetermined sample values, and the sample value used to represent the mask of the object is selected from the plurality of predetermined sample values according to value differences therebetween.

19. A method for detecting an object, the method comprising:
  receiving a bitstream;
  decoding coded information of the bitstream to obtain a primary picture and an auxiliary picture, wherein the auxiliary picture indicates a mask of an object in the primary picture, and the mask of the object is represented by a sample value of the auxiliary picture; and
  decoding the coded information of the bitstream to obtain a supplemental enhancement information (SEI) message, the SEI message indicating an attribute of the mask of the object.

20. The method according to clause 19, wherein decoding the coded information of the bitstream to obtain the SEI message comprises:
  determining a cancel flag indicating whether the SEI message cancels a persistence of a previous SEI message.

21. The method according to clause 20, wherein the attribute of the mask comprises individual features of the mask of the object and common features of a plurality of masks indicated by the SEI message, and
  wherein decoding the coded information of the bitstream to obtain the SEI message comprises:
    determining the common features and the individual features, in response to the determination that the cancel flag indicates that the SEI message does not cancel the persistence of information of the previous SEI message.

22. The method according to clause 19, wherein the attribute of the mask comprises individual features of the mask of the object and common features of a plurality of masks indicated by the SEI message, and the common features comprise at least one of the following:
  an identifier of the auxiliary picture to which the SEI message applies;
  a number of bits used for coding identifier of any of the plurality of masks;
  a bit-depth of sample value of the auxiliary picture;
  a confidence present flag indicating whether confidence information of the plurality of masks is comprised in the SEI message;
  a length of the confidence information of the plurality of masks, in response to the confidence present flag indicates that the confidence information of the plurality of masks is comprised in the SEI message;
  a depth present flag indicating whether depth information of the plurality of masks is comprised in the SEI message;
  a length of the depth information of the plurality of masks, in response to the depth present flag indicates that the depth information of the plurality of masks is comprised in the SEI message;
  a label present flag indicating whether label information of the plurality of masks are comprised in the SEI message;
  a language present flag indicating whether label language information of the plurality of masks is comprised in the SEI message, in response to label present flag indicates that the label information of the plurality of masks are comprised in the SEI message; or
  a label language information of the plurality of masks, in response to the language present flag indicates that the label language information of the plurality of masks is comprised in the SEI message.

23. The method according to clause 22, wherein the SEI message applies to a plurality of auxiliary pictures, and the common features further comprise a number of the plurality of auxiliary pictures.

24. The method according to clause 23, wherein the SEI message comprises the individual features generated for masks represented by the plurality of auxiliary pictures.

25. The method according to any of clauses 22 to 24, wherein the SEI message is associated with a plurality of primary pictures corresponding to the auxiliary pictures to which the SEI message applies.

26. The method according to clause 25, wherein the common features further comprise a number of the plurality of primary pictures and the layer identifiers of the plurality of primary pictures.

27. The method according to clause 26, wherein decoding the coded information of the bitstream to obtain the SEI message comprises:
determining a second number of the auxiliary pictures corresponding to each of the plurality of primary pictures; and
determining the individual features for the masks represented by the second number of the auxiliary pictures for each of the plurality of primary pictures.

28. The method according to any of clauses 19 to 27, wherein decoding the coded information of the bitstream to obtain the SEI message further comprises:
determining a mask cancel flag indicating whether the mask of the object cancels a persistence of a previous mask of the object.

29. The method according to any of clauses 19 to 28, wherein decoding the coded information of the bitstream to obtain the SEI message further comprises:
determining a bounding box compassing the mask of the object based on the SEI message.

30. The method according to any of clauses 19 to 29, wherein the mask of the object is indicated by a bit of the sample value of the auxiliary picture.

31. The method according to any of clauses 19 to 29, wherein the mask of the object is indicated by a sample value of the auxiliary picture.

32. The method according to clause 31, wherein the sample value is comprised in the SEI message.

33. The method according to clause 32, wherein decoding the coded information of the bitstream to obtain the SEI message further comprises:
determining the sample value of the auxiliary picture as representing the mask having a same identifier or a nearest identifier in value.

34. The method according to any of clauses 19 to 29, wherein the auxiliary pictures comprises a plurality of predetermined sample values, and the sample value used to represent the mask of the object is selected from the plurality of predetermined sample values according to value differences therebetween.

35. A non-transitory computer readable storage medium storing a bitstream of a video, the bitstream comprising:
a primary picture having an object;
an auxiliary picture indicating a mask of the object, the mask of the object being represented by a sample value of the auxiliary picture; and
a supplemental enhancement information (SEI) message indicating an attribute of the mask of the object.

36. The non-transitory computer readable storage medium according to clause 35, wherein the SEI message comprises a cancel flag indicating whether the SEI message cancels a persistence of a previous SEI message.

37. The non-transitory computer readable storage medium according to clause 36, wherein the attribute of the mask comprises individual features of the mask of the object and common features of a plurality of masks indicated by the SEI message, in response to the cancel flag indicates that the SEI message does not cancel the persistence of information of the previous SEI message.

38. The non-transitory computer readable storage medium according to clause 35, wherein the attribute of the mask comprises individual features of the mask of the object and common features of a plurality of masks indicated by the SEI message, and the common features comprise at least one of the following:
an identifier of the auxiliary picture to which the SEI message applies;
a number of bits used for coding identifier of any of the plurality of masks;
a bit-depth of sample value of the auxiliary picture;
a confidence present flag indicating whether confidence information of the plurality of masks is comprised in the SEI message;
a length of the confidence information of the plurality of masks, in response to the confidence present flag indicates that the confidence information of the plurality of masks is comprised in the SEI message;
a depth present flag indicating whether depth information of the plurality of masks is comprised in the SEI message;
a length of the depth information of the plurality of masks, in response to the depth present flag indicates that the depth information of the plurality of masks is comprised in the SEI message;
a label present flag indicating whether label information of the plurality of masks are comprised in the SEI message;
a language present flag indicating whether label language information of the plurality of masks is comprised in the SEI message, in response to label present flag indicates that the label information of the plurality of masks are comprised in the SEI message; or
a label language information of the plurality of masks, in response to the language present flag indicates that the label language information of the plurality of masks is comprised in the SEI message.

39. The non-transitory computer readable storage medium according to clause 38, wherein the SEI message applies to a plurality of auxiliary pictures, and the common features further comprise a number of the plurality of auxiliary pictures.

40. The non-transitory computer readable storage medium according to clause 39, wherein the SEI message comprises the individual features generated for masks represented by the plurality of auxiliary pictures.

41. The non-transitory computer readable storage medium according to any of clauses 38 to 40, wherein the SEI message is associated with a plurality of primary pictures corresponding to the auxiliary pictures to which the SEI message applies.

42. The non-transitory computer readable storage medium according to clause 41, wherein the common features further comprise a number of the plurality of primary pictures and the layer identifiers of the plurality of primary pictures.

43. The non-transitory computer readable storage medium according to clause 42, wherein the SEI message are further generated based on following operations:

determining a second number of the auxiliary pictures corresponding to each of the plurality of primary pictures; and determining the individual features for the masks represented by the second number of the auxiliary pictures for each of the plurality of primary pictures.

44. The non-transitory computer readable storage medium according to any of clauses 35 to 43, wherein the SEI message are further generated based on following operations:

determining whether the mask of the object is different from a previous mask of the object represented by a previous auxiliary picture; and encoding the attribute of the mask of the object in the SEI message, in response to the determination that the mask of the object is different from the previous mask of the object.

45. The non-transitory computer readable storage medium according to clause 44, wherein the SEI message are further generated based on following operations:

skip encoding, in response to the determination that the mask of the object is the same as the previous mask of the object, the attribute of the mask of the object in the SEI message.

46. The non-transitory computer readable storage medium according to any of clauses 35 to 45, wherein the SEI message are further generated based on following operations:

determining a mask cancel flag indicating whether the mask of the object cancels a persistence of a previous mask of the object.

47. The non-transitory computer readable storage medium according to any of clauses 35 to 46, wherein the SEI message are further generated based on following operations:

determining a bounding box compassing the mask of the object; and encoding the bounding box in the SEI message.

48. The non-transitory computer readable storage medium according to any of clauses 35 to 47, wherein the sample value of the auxiliary picture is encoded in a lossy manner.

49. The non-transitory computer readable storage medium according to any of clauses 35 to 47, wherein the mask of the object is indicated by a bit of the sample value of the auxiliary picture.

50. The non-transitory computer readable storage medium according to any of clauses 35 to 47, wherein the mask of the object is indicated by a sample value of the auxiliary picture.

51. The non-transitory computer readable storage medium according to clause 50, wherein the sample value is comprised in the SEI message.

52. The non-transitory computer readable storage medium according to any of clauses 35 to 47, wherein the auxiliary pictures comprises a plurality of predetermined sample values, and the sample value used to represent the mask of the object is selected from the plurality of predetermined sample values according to value differences therebetween.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for encoding a video sequence into a bitstream, the method comprising:

receiving a video sequence; and encoding one or more pictures of the video sequence to generate a bitstream, comprising:

encoding an auxiliary picture indicating a mask of an object in a primary picture, the mask of the object being represented by a sample value of the auxiliary picture; and generating a supplemental enhancement information (SEI) message indicating an attribute of the mask of the object.

2. The method according to claim 1, wherein generating the SEI message comprises:

determining a cancel flag indicating whether the SEI message cancels a persistence of a previous SEI message.

3. The method according to claim 2, wherein the attribute of the mask comprises individual features of the mask of the object and common features of a plurality of masks indicated by the SEI message, and wherein generating the SEI message further comprises:

determining the common features and the individual features, in response to the determination that the cancel flag indicates that the SEI message does not cancel the persistence of information of the previous SEI message.

4. The method according to claim 1, wherein the attribute of the mask comprises individual features of the mask of the object and common features of a plurality of masks indicated by the SEI message, and the common features comprise at least one of the following:

an identifier of the auxiliary picture to which the SEI message applies;

a number of bits used for coding identifier of any of the plurality of masks;

a bit-depth of sample value of the auxiliary picture;

a confidence present flag indicating whether confidence information of the plurality of masks is comprised in the SEI message;

a length of the confidence information of the plurality of masks, in response to the confidence present flag indicates that the confidence information of the plurality of masks is comprised in the SEI message;

a depth present flag indicating whether depth information of the plurality of masks is comprised in the SEI message;

a length of the depth information of the plurality of masks, in response to the depth present flag indicates that the depth information of the plurality of masks is comprised in the SEI message;

a label present flag indicating whether label information of the plurality of masks are comprised in the SEI message;

a language present flag indicating whether label language information of the plurality of masks is comprised in the SEI message, in response to label present flag indicates that the label information of the plurality of masks are comprised in the SEI message; or a label language information of the plurality of masks, in response to the language present flag indicates that the label language information of the plurality of masks is comprised in the SEI message.

5. The method according to claim 1, wherein generating the SEI message further comprises:

determining whether the mask of the object is different from a previous mask of the object represented by a previous auxiliary picture; and encoding the attribute of the mask of the object in the SEI message, in response to the determination that the mask of the object is different from the previous mask of the object.

6. The method according to claim 5, further comprising:

skip encoding, in response to the determination that the mask of the object is the same as the previous mask of the object, the attribute of the mask of the object in the SEI message.

7. The method according to claim 1, wherein generating the SEI message further comprises:

determining a mask cancel flag indicating whether the mask of the object cancels a persistence of a previous mask of the object.

8. The method according to claim 1, wherein generating the SEI message comprises:

determining a bounding box compassing the mask of the object; and encoding the bounding box in the SEI message.

9. The method according to claim 1, wherein the sample value of the auxiliary picture is encoded in a lossy manner.

10. The method according to claim 1, wherein the auxiliary pictures comprises a plurality of predetermined sample values, and the sample value used to represent the mask of the object is selected from the plurality of predetermined sample values according to value differences therebetween.

11. A method for detecting an object, the method comprising:

receiving a bitstream;

decoding coded information of the bitstream to obtain a primary picture and an auxiliary picture, wherein the auxiliary picture indicates a mask of an object in the primary picture, and the mask of the object is represented by a sample value of the auxiliary picture; and decoding the coded information of the bitstream to obtain a supplemental enhancement information (SEI) message, the SEI message indicating an attribute of the mask of the object.

12. The method according to claim 11, wherein decoding the coded information of the bitstream to obtain the SEI message comprises:

determining a cancel flag indicating whether the SEI message cancels a persistence of a previous SEI message.

13. The method according to claim 12, wherein the attribute of the mask comprises individual features of the mask of the object and common features of a plurality of masks indicated by the SEI message, and wherein decoding the coded information of the bitstream to obtain the SEI message comprises:

determining the common features and the individual features, in response to the determination that the cancel flag indicates that the SEI message does not cancel the persistence of information of the previous SEI message.

14. The method according to claim 11, wherein the attribute of the mask comprises individual features of the mask of the object and common features of a plurality of masks indicated by the SEI message, and the common features comprise at least one of the following:

an identifier of the auxiliary picture to which the SEI message applies;

a number of bits used for coding identifier of any of the plurality of masks;

a bit-depth of sample value of the auxiliary picture;

a confidence present flag indicating whether confidence information of the plurality of masks is comprised in the SEI message;

a length of the confidence information of the plurality of masks, in response to the confidence present flag indicates that the confidence information of the plurality of masks is comprised in the SEI message;

a depth present flag indicating whether depth information of the plurality of masks is comprised in the SEI message;

a length of the depth information of the plurality of masks, in response to the depth present flag indicates that the depth information of the plurality of masks is comprised in the SEI message;

a label present flag indicating whether label information of the plurality of masks are comprised in the SEI message;

a language present flag indicating whether label language information of the plurality of masks is comprised in the SEI message, in response to label present flag indicates that the label information of the plurality of masks are comprised in the SEI message; or a label language information of the plurality of masks, in response to the language present flag indicates that the label language information of the plurality of masks is comprised in the SEI message.

15. The method according to claim 11, wherein decoding the coded information of the bitstream to obtain the SEI message further comprises:

determining a mask cancel flag indicating whether the mask of the object cancels a persistence of a previous mask of the object.

16. The method according to claim 11, wherein decoding the coded information of the bitstream to obtain the SEI message further comprises:

determining a bounding box compassing the mask of the object based on the SEI message.

17. The method according to claim 11, wherein the mask of the object is indicated by a bit of the sample value of the auxiliary picture.

18. The method according to claim 11, wherein the mask of the object is indicated by a sample value of the auxiliary picture.

19. The method according to claim 11, wherein the auxiliary pictures comprises a plurality of predetermined sample values, and the sample value used to represent the mask of the object is selected from the plurality of predetermined sample values according to value differences therebetween.

20. A method for signaling a bitstream, the method comprising:

receiving a video sequence;

encoding the video sequence by:

encoding an auxiliary picture indicating a mask of an object in a primary picture, the mask of the object being represented by a sample value of the auxiliary picture; and generating a supplemental enhancement information (SEI) message indicating an attribute of the mask of the object; and signaling a bitstream that is generated based on the encoding.

* * * * *